United States Patent [19]
Kohda et al.

[11] Patent Number: 6,163,370
[45] Date of Patent: *Dec. 19, 2000

[54] IMAGE RECORDING APPARATUS AND APPLICATION DEVICE THEREOF

[75] Inventors: Hiroyuki Kohda; Astuhiro Doi; Kohji Uchida, all of Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/149,016

[22] Filed: Sep. 8, 1998

Related U.S. Application Data

[62] Division of application No. 08/598,336, Feb. 8, 1996, Pat. No. 5,838,427.

[30] Foreign Application Priority Data

Feb. 10, 1995 [JP] Japan ................................. 7-23214
Jan. 11, 1996 [JP] Japan ................................. 8-3235

[51] Int. Cl.[7] ................................................. G03B 27/30
[52] U.S. Cl. ......................................................... 355/100
[58] Field of Search .................................. 355/27, 72, 75, 355/99, 100, 103; 396/30, 31, 38

[56] References Cited

U.S. PATENT DOCUMENTS

| | | | |
|---|---|---|---|
| 3,628,858 | 12/1971 | Dittner | 355/3 |
| 3,685,906 | 8/1972 | Raterman | 355/103 |
| 3,877,805 | 4/1975 | Heldenbrand et al. | 355/10 |
| 4,034,189 | 7/1977 | Sakamaki et al. | 219/216 |
| 4,073,584 | 2/1978 | Kitajima | 355/8 |
| 4,800,275 | 1/1989 | Shimizu et al. | 250/317.1 |
| 4,851,881 | 7/1989 | Yamamoto et al. | 355/27 |
| 4,998,131 | 3/1991 | Ueda et al. | 355/27 |
| 5,032,848 | 7/1991 | Morita | 346/1.1 |
| 5,122,433 | 6/1992 | Kawaguchi | 430/203 |
| 5,486,891 | 1/1996 | Rousmaniere et al. | 354/301 |
| 5,493,363 | 2/1996 | Morita | 355/99 |
| 5,805,936 | 9/1998 | Matsuzaki et al. | 396/30 |
| 5,917,583 | 6/1999 | Kohda et al. | 355/100 |
| 5,923,410 | 7/1999 | Kohda et al. | 355/97 |

FOREIGN PATENT DOCUMENTS 0 123 892  11/1984  European Pat. Off. .......... G03C 1/02

OTHER PUBLICATIONS

Patent Abstracts of Japan, vol. 013 No. 165 (P–860), Apr. 20, 1989, JP–A–64 002040 (Fuji Photo Film Co., LTD.) Jan. 6, 1989 *Abstract.

*Primary Examiner*—Alan A. Mathews
*Assistant Examiner*—Christopher S. Mahoney
*Attorney, Agent, or Firm*—Sughrue, Mion, Zinn, Macpeak & Seas, PLLC

[57] ABSTRACT

An image recording apparatus which effects digital exposure while aiming for compactness. An exposure unit digitally exposes a photosensitive material successively while moving above a stage. An application unit moves from the rear side of the exposure unit and applies water successively to the photosensitive material. A superposing unit moves from the rear side of the application unit, and successively superposes an image-receiving material on the photosensitive material. Heat development transfer is carried out, and an image is obtained on the image-receiving material.

4 Claims, 24 Drawing Sheets

IMAGE RECORDING APPARATUS AND APPLICATION DEVICE THEREOF

This is a divisional of application Ser. No. 08/598,336 filed Feb. 8, 1996 now U.S. Pat. No. 5,838,427 the disclosure of which is incorporated herein by reference.

BACKGROUND OF THE INVENTION

1. Field of the Invention

The present invention relates to an image recording apparatus which exposes an image on a photosensitive material and superposes the photosensitive material and an image-receiving material and effects heat development transfer so as to obtain an image on the image-receiving material, and to an application device used in the image recording apparatus and applying a solvent for image formation onto the photosensitive material to obtain an image on the photosensitive material.

2. Description of the Related Art

There exist image recording apparatuses which expose a photosensitive material, apply a solvent for image formation to the exposed photosensitive material, superpose an image-receiving material on the photosensitive material to which the solvent has been applied so that heat development transfer is carried out, so as to obtain an image on the image-receiving material. In this type of conventional image recording apparatus, exposure, application and heat development transfer have conventionally been carried out on respectively different stages. More specifically, the photosensitive material is exposed at an exposure stage. Thereafter, the photosensitive material is conveyed and application is carried out at an application stage which is separate from the exposure stage. Thereafter, the photosensitive material is again conveyed, an image-receiving material is superposed thereon, and heat development transfer is carried out at a transfer stage which is separate from the exposure stage and the application stage.

Effecting exposure, application and heat development transfer at respectively separate stages leads to the apparatus becoming larger on the whole. Further, although there are conventional apparatuses in which an image of a document on a document stand is directly exposed onto the photosensitive material, the implementation of an image recording apparatus in which the image is once read by a memory or the like and digitally exposed is desirable.

Further, in conventional image recording apparatuses such as those described above, the photosensitive material image-exposed in the exposure section is exposed with the ambient temperature at an ordinary temperature. However, the characteristics, color density and color balance of a photosensitive material change easily due to variations in the temperature at the time of exposure. As a result, variations in the ambient temperature at the time of exposure are an obstacle to obtaining stable images of high image quality. In particular, in order to make the image recording apparatus more compact on the whole, the heat development transfer section must be disposed in a vicinity of the exposure section. The variations in temperature of the heat development transfer section affect the exposure section, and countermeasures are needed to overcome this drawback.

There exist image recording apparatuses which expose the image of a document onto a photosensitive material, superpose an image-receiving material onto the photosensitive material after exposure, and effect heat development transfer so as to obtain an image on the image-receiving material. Here, when heat development transfer is carried out with the photosensitive material and the image-receiving material affixed together and entrained about a drum, while the drum rotates, the photosensitive material is peeled from the drum by utilizing a pawl, and the image-receiving material is peeled from the photosensitive material by utilizing a pawl different from the aforementioned pawl. Pawls are thereby needed, and need for two types of pawls results in a lack of stability in peeling.

SUMMARY OF THE INVENTION

In view of the aforementioned, an object of the present invention is to provide an image recording apparatus which enables digital exposure while aiming for compactness.

Another object of the present invention is to provide an image recording apparatus in which, even if the photosensitive characteristics of a photosensitive material vary easily due to variations in temperature, fluctuations in color density and color balance can be reduced so that stable images of high image quality can be obtained.

Yet another object of the present invention is to provide an image recording apparatus in which pawls are not needed for peeling so that peeling of a photosensitive material and an image-receiving material is effected stably.

Still other objects of the present invention are to provide recording of images of high image quality by uniformly and stably applying a solvent to a photosensitive material, and to aim for conservation of electric power and a decrease in the start-up time of the image recording apparatus.

The present invention is an image recording apparatus in which an image is exposed on a photosensitive material, the photosensitive material and an image-receiving material are superposed and heat development transfer is effected so that an image is obtained on the image-receiving material, comprising: exposure means for exposing the image onto the photosensitive material; a stage which holds the photosensitive material; an application unit which applies a solvent for image formation onto the photosensitive material held on the stage; a superposing unit which superposes the image-receiving material on the photosensitive material held on the stage; and heating means for heating the photosensitive material and the image-receiving material which are superposed together and held on the stage.

The exposure means exposes an image onto the photosensitive material. With the photosensitive material entrained about and held at the stage, the application unit applies a solvent for image formation to the photosensitive material, the superposing unit superposes the image-receiving material on the photosensitive material, and the superposed photosensitive material and image-receiving material are heated by the heating means. Namely, an image can be exposed onto the photosensitive material by the exposure means moving or by the photosensitive means moving.

Further, after the photosensitive material is exposed by the exposure means, on the common stage, the solvent for image formation is applied, the image-receiving material is superposed on the photosensitive material, and heat development transfer onto the image-receiving material is carried out, so that an image is obtained on the image-receiving material. Accordingly, because the stage is used in common, there is no need to provide separate stages as in the conventional art, and the apparatus can be made more compact. More specifically, conveying means between stages, e.g., rollers or the like, are not needed, and fewer parts can be used and manufacturing costs decrease. Further, the conveying distance is shortened, and the processing speed is made faster.

The heat for the solvent for image formation when the solvent is applied and the heat needed for heat development transfer are obtained by, for example, heating the stage. Because a common heating means can be used, energy can be conserved and the apparatus can be made even more compact.

The image of the document may be scan-exposed onto the photosensitive material by moving the exposure means in one direction relatively to the photosensitive material. At the time of exposure, the exposure means is fixed and successively scan-exposes the moving photosensitive material. Therefore, focusing of the exposure means is easy. For example, if the exposure means is positioned above the stage, the exposure means exposes the image of the document from above the stage, and therefore, the apparatus can be made even more compact. On the other hand, by effecting scan-exposure by moving the exposure means, application of the solvent for image formation, superposing of the image-receiving material on the photosensitive material, heat development transfer onto the image-receiving material, as well as exposure can be effected at a common stage, and the apparatus can be made more compact.

Further, if the exposure means effects sub-scanning by moving in one direction relatively to the photosensitive material and carries out digital exposure onto the photosensitive material by main scanning a light beam in a direction orthogonal to the sub-scanning direction, digital exposure at high speed is made possible by using, for example, a polygon mirror or the like. If the exposure means carries out digital exposure planarly onto the photosensitive material, the processing speed is made faster.

BRIEF DESCRIPTION OF THE DRAWINGS

FIG. 8 is a time chart of the respective units such as the exposure unit and the like.

FIG. 21 is a time chart of the respective units such as the exposure unit and the like.

DESCRIPTION OF THE PREFERRED EMBODIMENTS

[First Embodiment]

A first embodiment of the image recording apparatus relating to the present invention will be described hereinafter on the basis of FIGS. 1 through 10.

Figure 1:
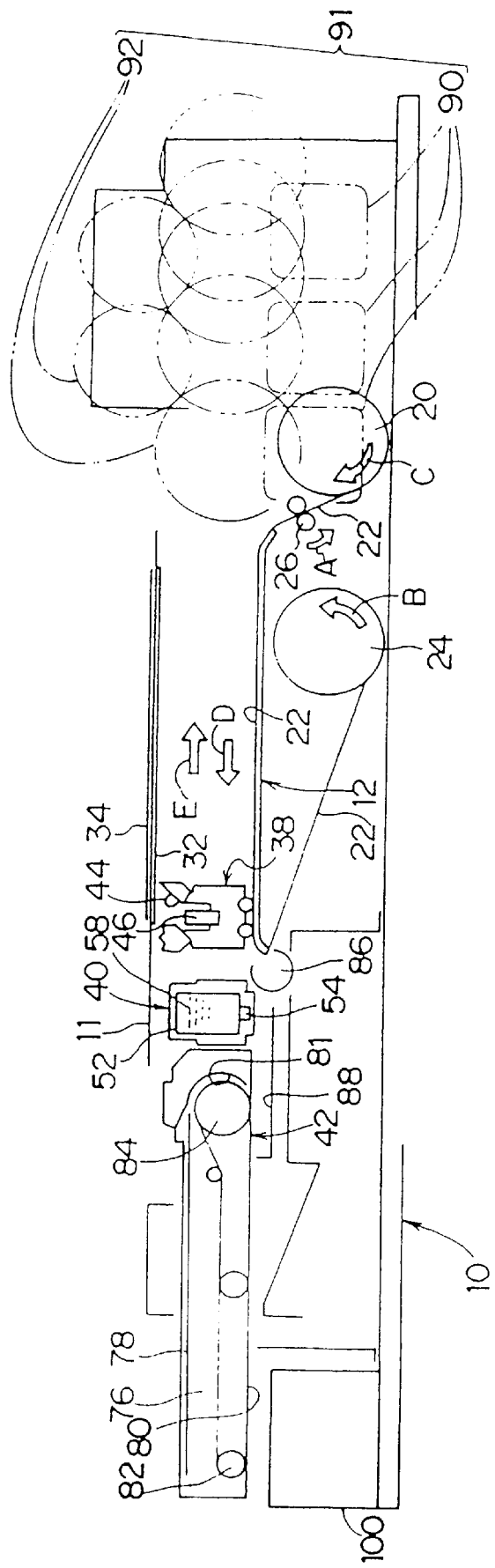
FIG. 1 is a view, seen along a moving direction of respective units such as an exposure unit, of an image recording apparatus relating to a first embodiment of the present invention.
Figure 2:
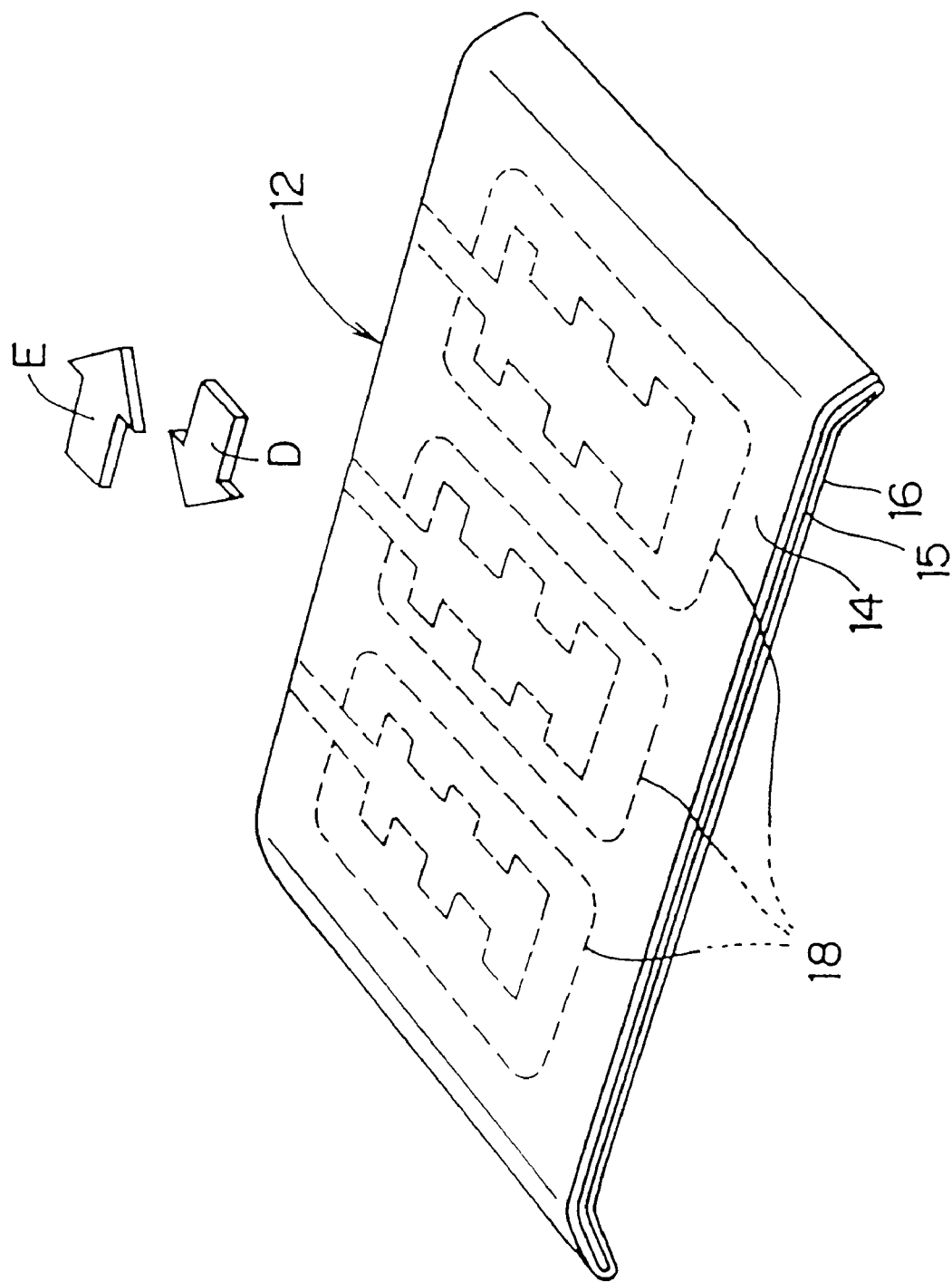
FIG. 2 is a perspective view of a stage at which exposure and the like are effected.

As illustrated in FIG. 1, a stage 12 (temperature raising means) is provided at a central portion within a base stand 10. The stage 12 is shaped as a flat-plate and is disposed horizontally. More specifically, as illustrated in FIG. 2, the stage 12 is formed of three layers: a sheet plate 15 is interposed between an aluminum plate 14 at the upper surface side and a stainless plate 16 at the lower surface side. The sheet plate 15 is provided with heat plates 18 (three, for example) which serve as heating means and are disposed in a row. By supplying electricity to the heat plates 18, the temperature of the entire upper surface of the stage 12 can be raised (heated) to and maintained at, for example, 80° C. The size of the stage may be set arbitrarily, and may be, for example, a size corresponding to A6 size.

A first roller 20 is provided at a position lower than the stage 12 at the front end side thereof (the right end side in FIG. 1). A heat development photosensitive material 22 (hereinafter, "photosensitive material 22") serving as a photosensitive material is wound around the first roller 20 so as to be accommodated in a roll form. The photosensitive material 22 includes a photosensitive silver halide, a binder, a dye-providing material, and a reducing agent on top of a supporting body. The photosensitive surface of the photosensitive material 22 faces upward when the photosensitive material 22 is withdrawn from the first roller 20 and is held horizontally on the stage 12 as will be described later.

A second roller 24 is provided under the stage 12 and adjacent to the first roller 20. The photosensitive material 22, which has been pulled out from the first roller 20 and which extends across the stage 12 from the front end to the rear end (left end in FIG. 1) thereof, is taken up onto the second roller 24. Nip rollers 26 are disposed between the front end of the stage 12 and the first roller 20. If the nip rollers 26 are driven to rotate in the direction of arrow A and the second roller 24 is driven to rotate in the direction of arrow B, as the first roller 20 rotates in the direction of arrow C, the photosensitive material 22 is pulled out from the first roller 20, moves on the stage 12 in the direction of arrow D (from the front end toward the rear end of the stage 12), and is pulled and taken-up by the second roller 24. Conversely, if the first roller 20 is driven to rotate in the direction opposite to the direction of arrow C and the nip rollers 26 are driven to rotate in the direction opposite the direction of arrow A, the photosensitive material 22 moves on the stage 12 in the direction of arrow E which is opposite to the direction of arrow D. The photosensitive material 22 is rewound from the second roller 24 onto the first roller 20 as the second roller 24 rotates in the direction opposite to the direction of arrow B.

In this way, the photosensitive material 22 can be pulled out from the first roller 20 and taken-up onto the second roller 24 such that a predetermined length thereof is supplied onto the stage 12. Conversely, a predetermined length of the photosensitive material 22 can be rewound.

Figure 3:
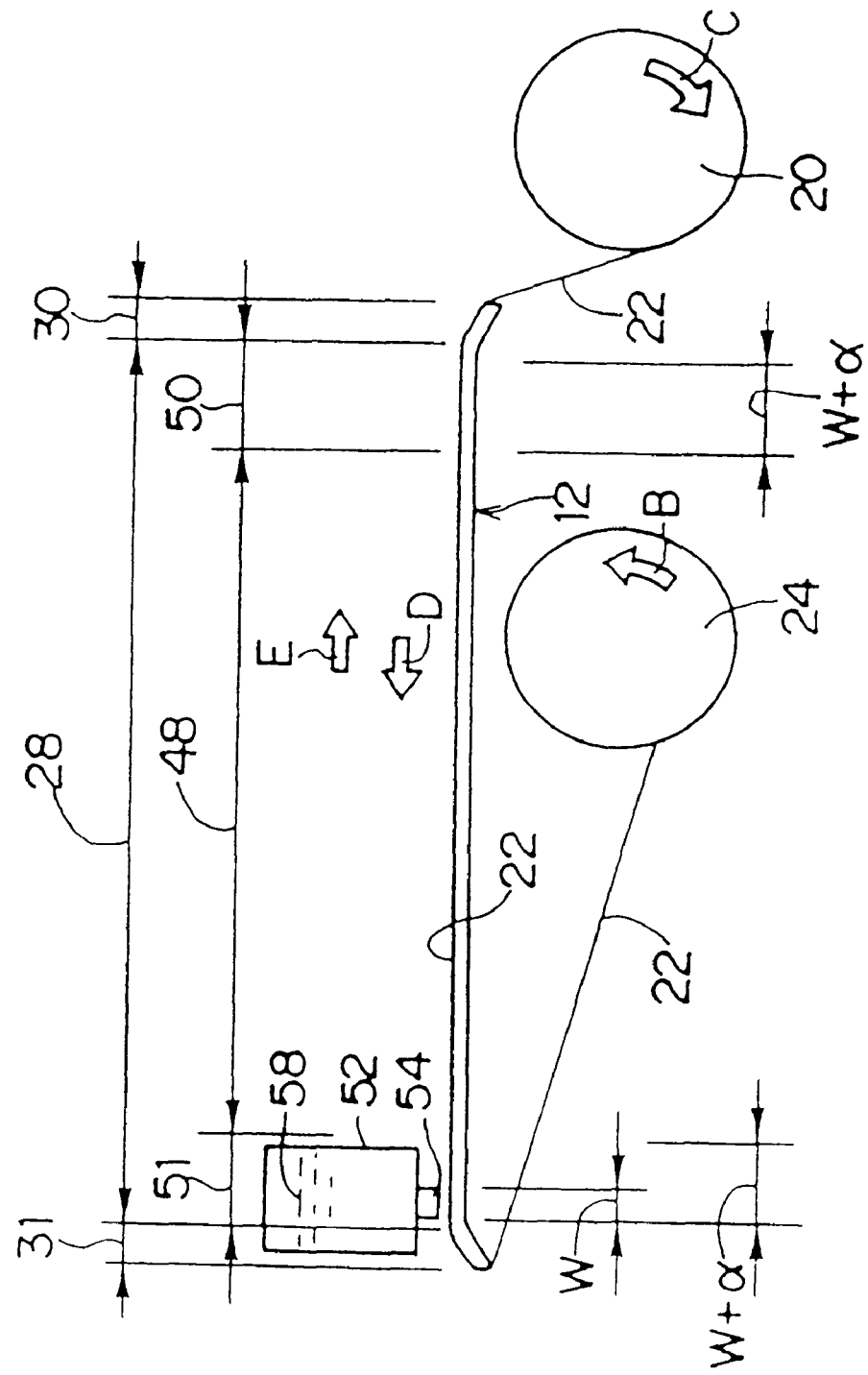
FIG. 3 is a view of a stage seen along front-and-back directions thereof.
Figure 4:
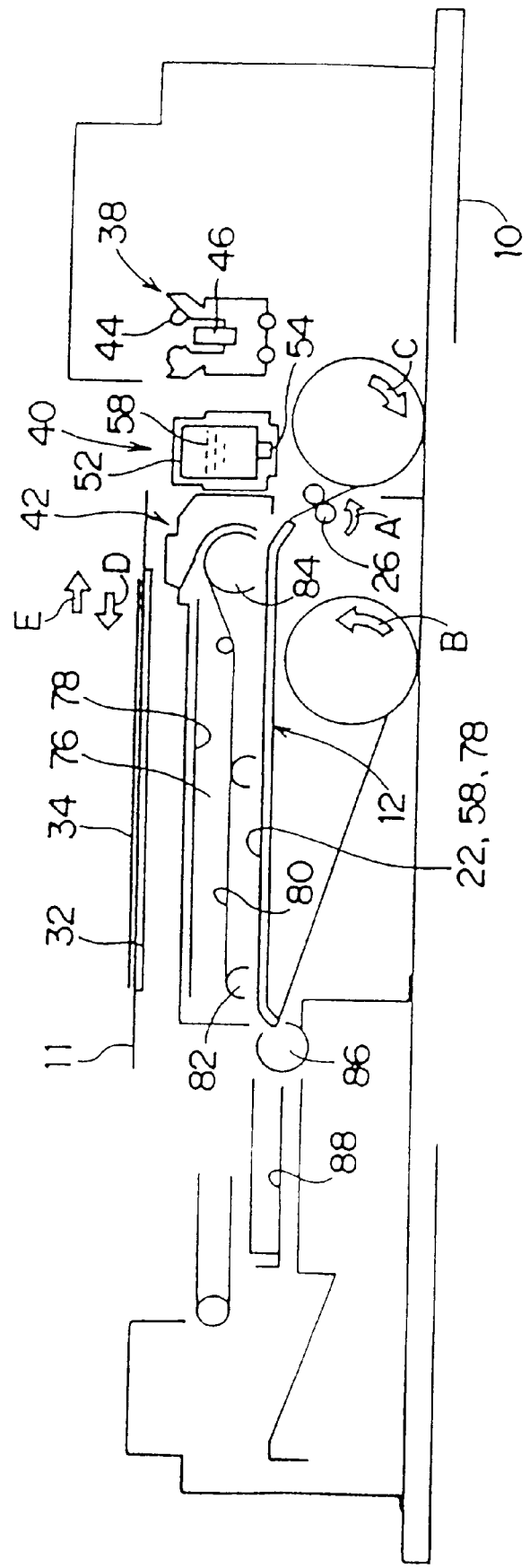
FIG. 4 is a view corresponding to FIG. 1 at the time that the respective units such as the exposure unit are at stop positions.

As illustrated in FIG. 3, the top surface of the stage 12 includes a planar portion 28, which is a horizontal flat surface, and inclined portions 30, 31 at which the top surface inclines downwardly at the front and rear end portions of the stage 12. During exposure and the like which will be described later, the photosensitive material 22 is held on the stage 12 with a predetermined length of the photosensitive material 22 positioned on the planar portion 28 and with the photosensitive material 22 pulled along the inclined portions 30, 31, so that the planarity of the predetermined length of the photosensitive material 22 along the top surface of the planar portion 28 is maintained and the predetermined length of the photosensitive material 22 does not become slack.

A document stand 32 is fit above the stage 12 at a base stand top surface 11 so as to oppose the stage 12. The document stand 32 is formed by a transparent plate. A document 34 is placed and held on the document stand 32.

An exposure unit 38, an application unit 40 and a superposing unit 42 are respectively provided so as to be freely movable reciprocally along the front-and-back directions of the stage 12, between the document stand 32 and the stage 12. The respective units 38, 40, 42 advance (the advancing direction is the direction of arrow E) from standby positions (the positions illustrated in FIG. 1), at which the units 38, 40, 42 are disposed in order so as to extend from the rear end of the stage 12 to a region off of the stage 12, to stop positions (the positions illustrated in FIG. 4), at which the units 38, 40, 42 are disposed in order so as to pass beyond the front end of the stage 12 and extend to the stage 12 from a region off of the stage 12. Conversely, the respective units 38, 40, 42 can withdraw (the withdrawing direction is the direction of arrow D) from the stop positions to the standby positions.

The exposure unit 38 is equipped with a light source 44 and a SELFOC lens (lens array) 46. The light source 44 may be an LED, a halogen lamp or the like. The light from the light source 44 is irradiated toward the document 34. The irradiated light is linear along a direction parallel to the document and orthogonal to the moving direction of the exposure unit 38 (the front-and-back directions of the stage 12), i.e., the irradiated light is linear along directions orthogonal to the surface of the drawing of FIG. 1. The irradiated light is reflected at the document 34, and is exposed by the SELFOC lens 46 in a slit-like form onto the photosensitive material 22. Due to the exposure unit 38 advancing from the standby position to the stop position, the image of the document 34 is successively scan-exposed onto the photosensitive material 22.

As illustrated in FIG. 3, an exposure region 48 (image region) is set at the center of the range of the predetermined length of the photosensitive material 22 such that unexposed regions (non-image regions) are formed at the front and rear of the exposure region 48. The non-image region at the rear end side of the stage 12 is the front region 51, and the non-image region at the front end side of the stage 12 is the rear region 50.

Figure 5:
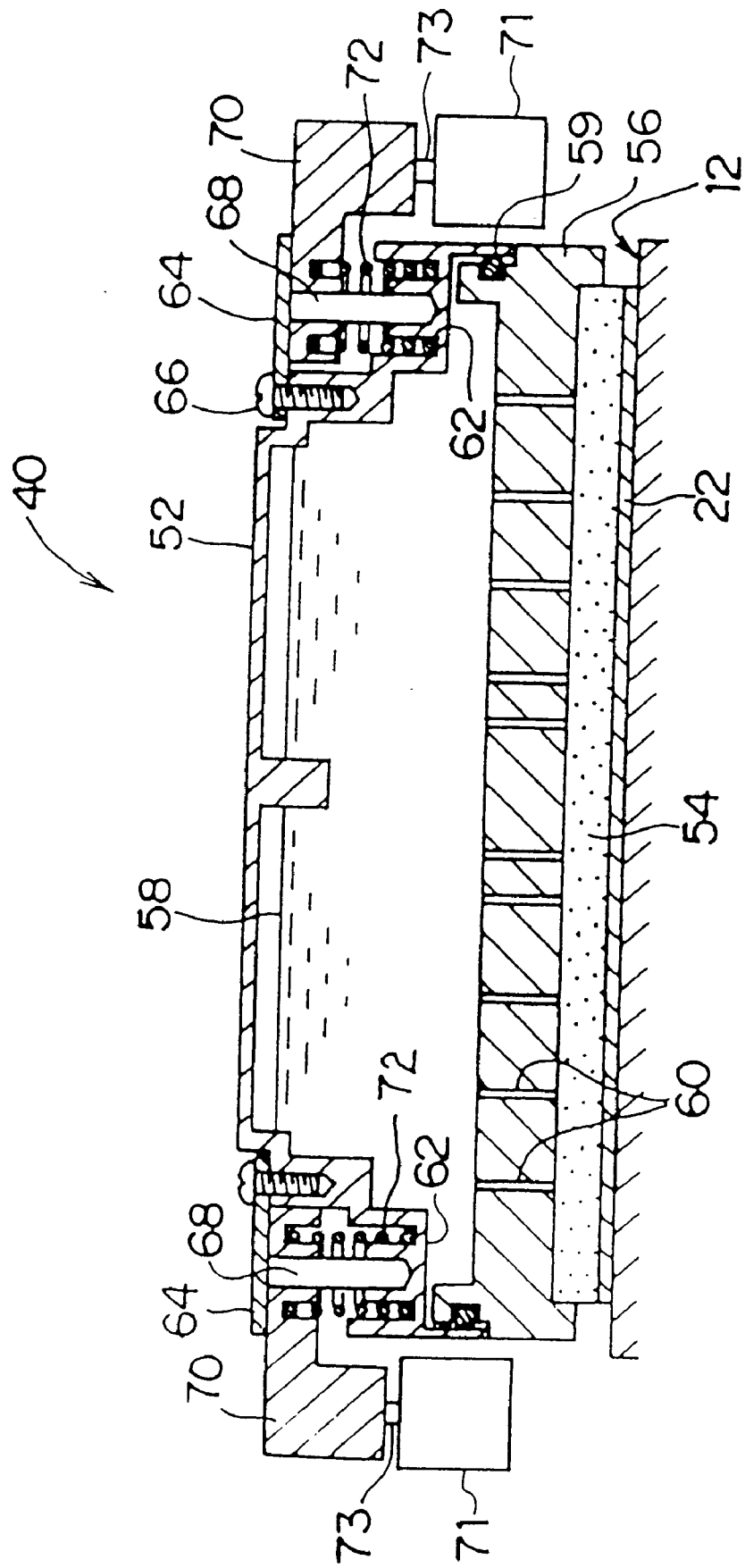
FIG. 5 is a longitudinal sectional view of an application unit seen from a moving direction thereof.

The application unit 40 is structured such that a sponge (application portion) 54 is provided at the bottom of a tank 52 (container). The tank 52 is shaped as a rectangular box which is parallel to the photosensitive material 22 and which is elongated in a direction orthogonal to the front-and-back directions of the stage 12. As illustrated in FIG. 5, the tank 52 is closed via an O-ring 59 by a cover 56 which forms the tank bottom, such that the interior of the tank 52 is sealed. A transfer assistant (solvent for image formation) such as water 58 or the like is filled within the tank 52. The sponge 54 is fixed to the outer surface of the cover 56 (the cover bottom surface). Communicating holes 60 which communicate with the sponge 54 are formed in the cover 56. The water within the tank 52 is absorbed and held by the sponge 54 through the communicating holes 60. The upper portions of the longitudinal direction ends of the tank 52 are notched so as to form steps 62. A supporting portion 64 is fastened by a bolt 66 to the upper end of the tank 52 and projects so as to oppose the step 62. An engagement shaft 68 extends in upward and downward directions between the supporting portion 64 and the step 62. One end portion of an operation block 70 is fit with the engagement shaft 68. A coil spring 72 is fit between the operation block 70 and the step 62. The coil spring 72 urges the operation block 70 to abut the supporting portion 64. A plunger 73 of a solenoid 71 (first moving means) is connected to the other end portion of the operation block 70. For example, by supplying electricity to the solenoids 71, the operation blocks 70 are lowered, and by stopping the supply of electricity to the solenoids 71, the operation blocks 70 are raised. At the raised positions of the operation blocks 70, the sponge 54 is separated from the photosensitive material 22. When the operation blocks 70 are lowered, the tank 52 is lowered and the sponge 54 contacts the photosensitive material 22. The amount by which the operation blocks 70 are lowered is greater than the interval between the sponge 54 and the photosensitive material 22 at the raised positions of the operation blocks 70. At the lowered positions of the operation blocks 70, the sponge 54 is pushed against the photosensitive material 22 by the urging force of the coil springs 72. In this way, the sponge 54 is compressed, and the water which has been absorbed and held by the sponge 54 flows out to the photosensitive material 22.

The application unit 40 is driven by a driving means 91 (second moving means) formed by a drive motor 90, a group of gears 92 and a timing belt 94 as will be described later, and begins to advance after the advance of the exposure unit 38.

The first moving means 71, which lowers the sponge 54 together with the tank 52, and the second moving means 91, which moves the sponge 54 together with the tank 52 from the standby position to the stop position, are controlled as follows.

First, the application unit 40 is at the raised position and separated from the photosensitive material 22. When the application unit 40 enters into the region above the stage 12 and reaches the planar portion 28 from the inclined portion 31 at the rear end side of the stage 12 (as illustrated in FIG. 3), at the front region 51, the solenoids 71 are operated so that the sponge 54 is lowered together with the tank 52 and the sponge 54 contacts the photosensitive material 22.

Thereafter, the application unit 40 advances with the sponge 54 contacting the photosensitive material 22. The application unit 40 enters into the image region 48 from the front region 51, moves through the image region 48, and reaches the rear region 50. Water 58 is successively applied onto the photosensitive material 22 by the application unit 40 advancing with the sponge 54 contacting the photosensitive material 22. When the sponge reaches the rear region 50, at the rear region 50, the sponge 54 is raised together with the tank 52 so that the sponge 54 separates from the photosensitive material 22 and contact of the sponge 54 and the photosensitive material 22 is stopped. Thereafter, the application unit 40 is moved to the stop position and is stopped thereat.

When the sponge 54 is lowered and contacts the photosensitive material 22 in the front region 51, the advance of the application unit is temporarily stopped, and after contact, the advance resumes. However, the sponge 54 may be lowered while the application unit 40 is advancing, without stopping the advance of the application unit 40.

The advance of the application unit 40 is not stopped when the sponge 54 is separated from the photosensitive material 22 in the rear region 50, so that there is no need to stop the superposing unit 42 following behind. However, when the sponge 54 and the photosensitive material 22 separate, the advance of the superposing unit 42 may be stopped temporarily.

The water 58 applied to the photosensitive material 22 swells thereat. After swelling, the water 58 on the photosensitive material 22 is squeezed. It is possible to effect squeezing by using an unillustrated roller. However, it is also possible to effect squeezing by utilizing the rigidity of the image-receiving material 78 as superposing is carried out by the superposing unit 42 as will be described later. In this case, in order to ensure the time necessary for swelling, the superposing unit 42 following after the application unit 40 advances with a space between the application unit 40 and the superposing unit 42.

The superposing unit 42 is provided with a magazine 76 in which image-receiving materials 78 are cut to predetermined lengths and stacked so as to be accommodated parallel to the stage 12. One of the surfaces of the image-receiving material 78 is an image forming surface. A dye-fixing material having mordant is applied to the image forming surface of the image-receiving material 78. In their accommodated state, the image-receiving materials 78 are stacked with the image forming surfaces thereof facing upward. Beneath the magazine 76, an endless belt 80 is entrained about rollers 82, 84. A guide portion 81 is provided at the outer periphery of the roller 84 which is at the stage 12 side at the standby position of the superposing unit 42.

Figure 6:
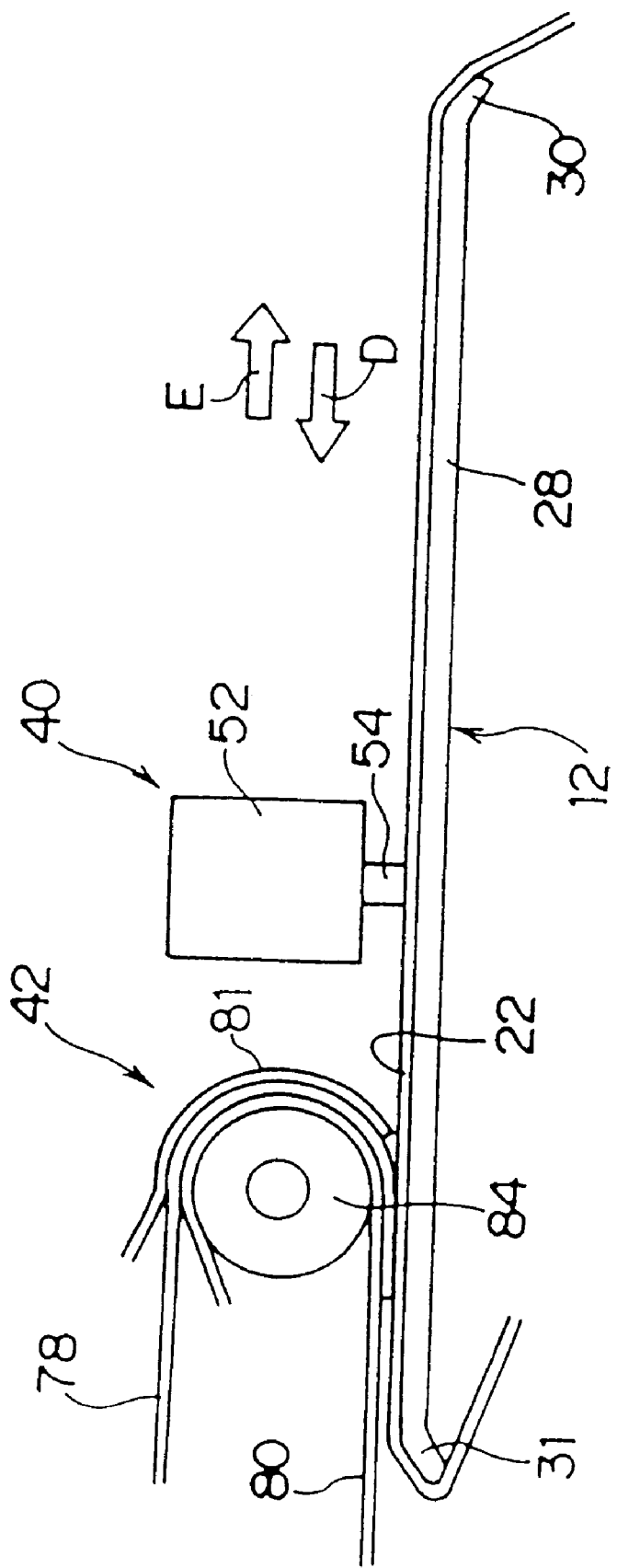
FIG. 6 is a view illustrating a process of a superposing unit superposing an image-receiving material onto a photosensitive material on the stage.
Figure 7:
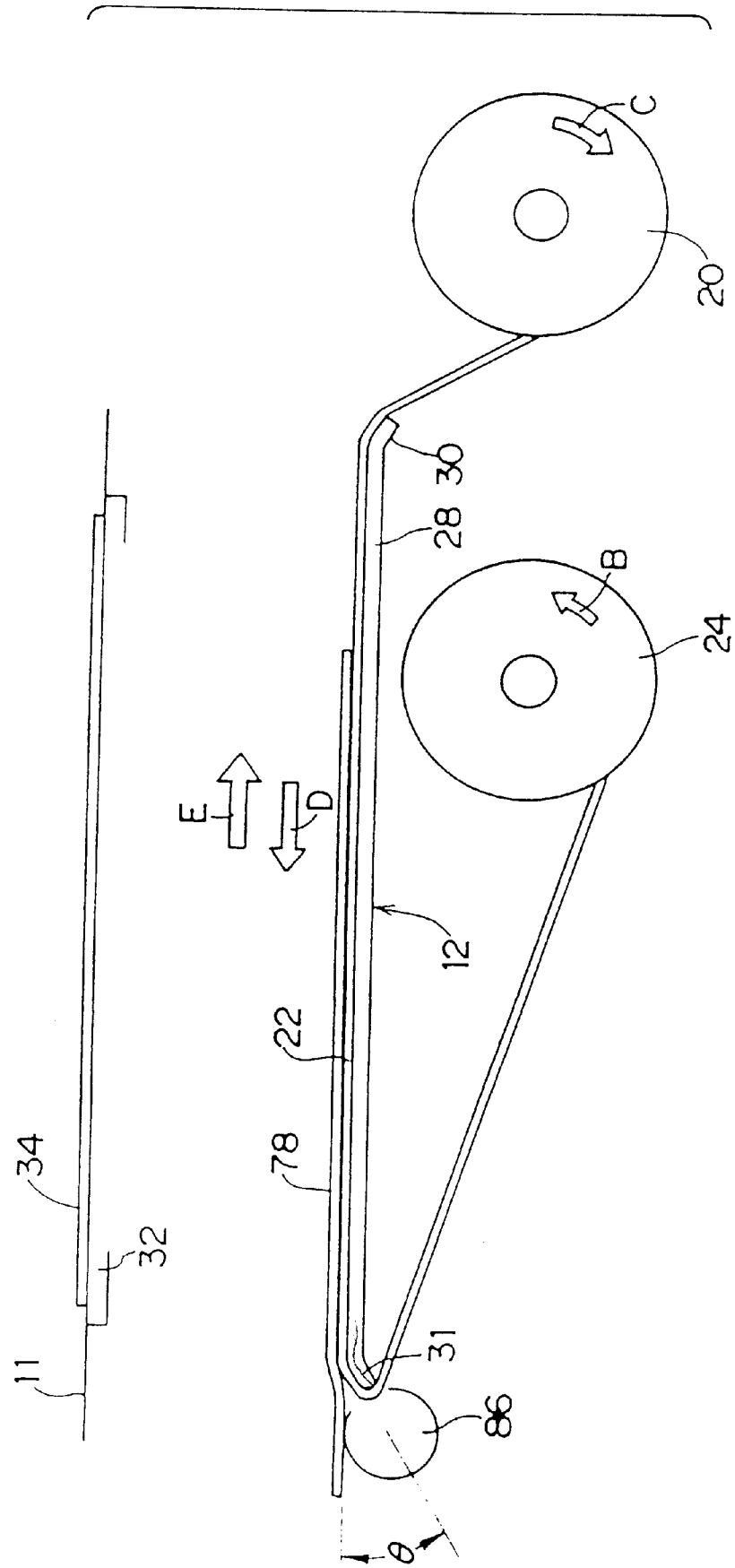
FIG. 7 is a view illustrating a process of peeling the photosensitive material and the image-receiving material when the photosensitive material and the image-receiving material are discharged off of the stage.

As the superposing unit 42 advances, the endless belt 80 reaches the region above the stage 12 and travels clockwise in FIG. 1 above the stage 12 in accordance with the advance of the superposing unit 42. As illustrated in FIG. 6, as the endless belt 80 travels, the image-receiving material 78 within the magazine 76 is pulled out from the magazine 76 and inverted by the guide portion 81. The pulled-out end thereof contacts the photosensitive material 22. Thereafter, as the superposing unit 42 moves, the image-receiving material 78 is superposed on the photosensitive material 22 successively toward the front end of the stage 12 such that the image-receiving material 78 is nipped between the endless belt 80 and the photosensitive material 22.

The water 58 applied to the photosensitive material 22 swells thereat. In order to ensure the time necessary for swelling, the superposing unit 42 advances with a space between the application unit 40 and the superposing unit 42. After swelling, the water 58 on the photosensitive material 22 is squeezed. It is possible to effect squeezing with an unillustrated roller. However, it is also possible to effect squeezing by utilizing the rigidity of the image receiving material 78 as superposing is carried out by the superposing unit 42. The rigidity contributes to the squeezing. Since the water 58 is squeezed, the image-receiving material 78 and the photosensitive material 22 are fit together tightly.

The stage 12 is heated by the heat plates 18 as described above. In this heated state, the above-described exposure, application and superposing are effected, and the water is heated when applied. More specifically, the water 58 is heated in the process of flowing out from the sponge 54 to the photosensitive material 22, and the water 58 which has flowed out and been applied to the photosensitive material 22 is also heated.

Due to the heating of the stage 12, heat development transfer is carried out with the image-receiving material 78 superposed with the photosensitive material 22. More specifically, mobile dyes of the photosensitive material 22 are released, and simultaneously, the dyes are transferred to the dye-fixing layer of the image-receiving material 78 so that an image is obtained on the image-receiving material 78.

After heat development transfer, the photosensitive material 22 is moved a predetermined amount in the direction of arrow D and, together with the image-receiving material 78, is discharged off of the stage 12 from the rear end of the stage 12.

The driving motor 90 is provided at the base stand 10 at the front side of the front end of the stage 12. The driving motor 90 drives and moves the exposure unit 38, the application unit 40, and the superposing unit 42 via the group of gears 92 and the timing belt 94.

The overall operation of the present image recording apparatus is controlled by a control device 100 (control means) formed by a CPU, ROM, RAM, busses and the like. For simplicity of explanation in the present embodiment, illustration and description of sensors for detecting positions, temperatures and the like, operation devices such as a keyboard or the like for inputting information to the control device 100 for operation, the electrical connection relationships between the control device 100 and the respective drive portions and sensors, and the like will be omitted as they are familiar to those skilled in the art.

Figure 8:
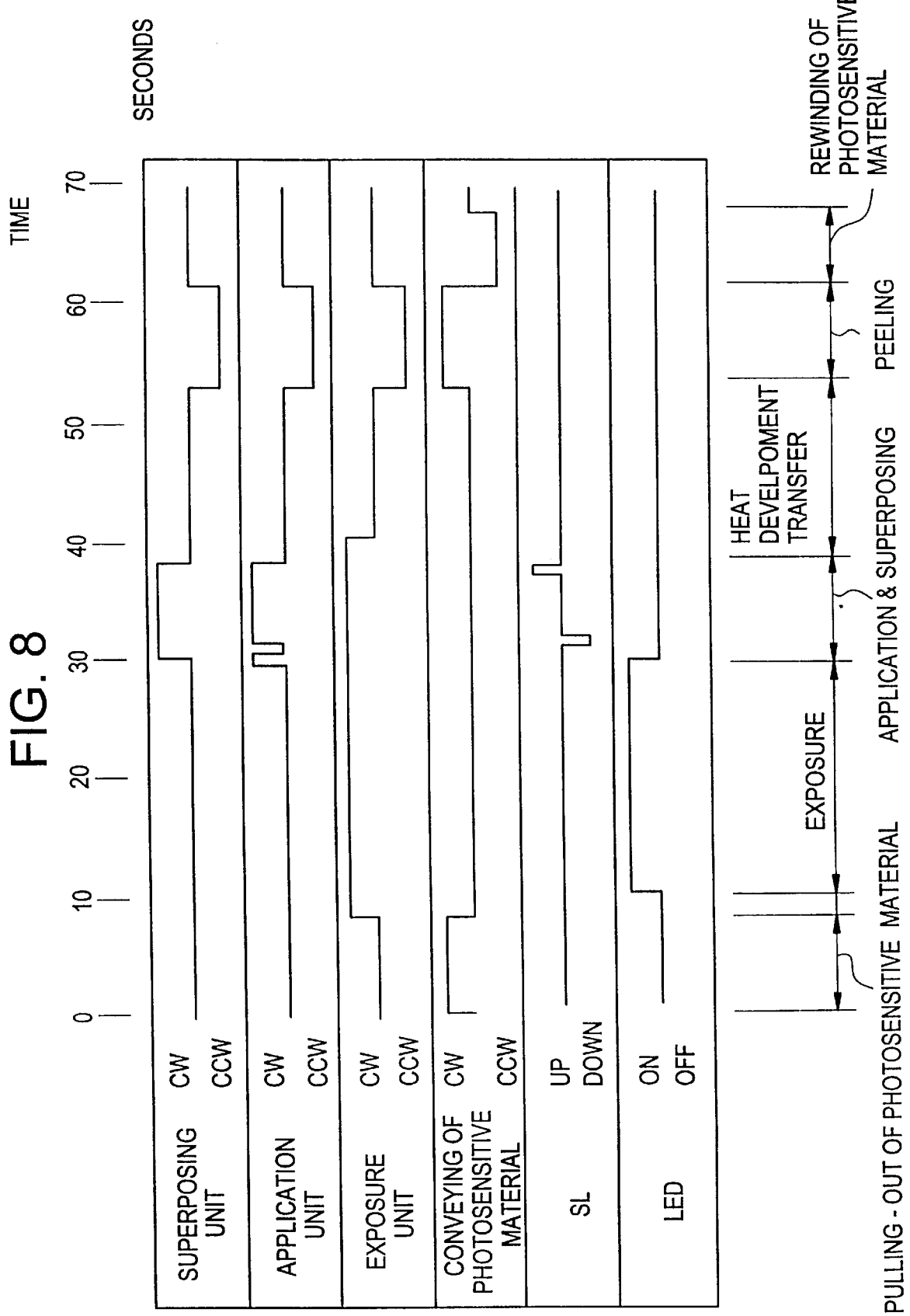

Next, the overall operation of the present apparatus including the units 38, 40, 42 will be explained concretely on the basis of the time chart of FIG. 8.

First, the photosensitive material 22 is conveyed (CW) such that a predetermined length thereof is pulled out onto and held at the stage 12.

Next, when the exposure unit 38 advances (CW) from the standby position toward the stop position and the photosensitive material 22 enters the image region 48, the light source 44 begins irradiating light (ON). The irradiation of light continues at the image region 48, and the image of the document 34 on the document stand 32 is scan-exposed onto the photosensitive material 22.

When the exposure unit 38 moves past the image region 48 and enters into the rear region 50, the light source 44 stops irradiating light (OFF). Thereafter, the exposure unit 38 advances to the stop position with the light source 44 not irradiating light, and is stopped thereat.

The advance (CW) of the application unit 40 begins when the exposure unit 38 moves past the image region 48 and enters into the rear region 50 and the light source 44 stops irradiating light.

The application unit 40 is originally at the raised position and is separated from the photosensitive material 22. The application unit 40 enters the region above the stage 12, reaches the planar portion 28 from the inclined portion 31 at the rear end side of the stage 12, and is temporarily stopped at the front region 51 (as illustrated in FIG. 3). In this stopped state, the solenoids (SL) are operated (DOWN), so the sponge 54 is lowered together with the tank 52 and contacts the photosensitive material 22.

Figure 9:
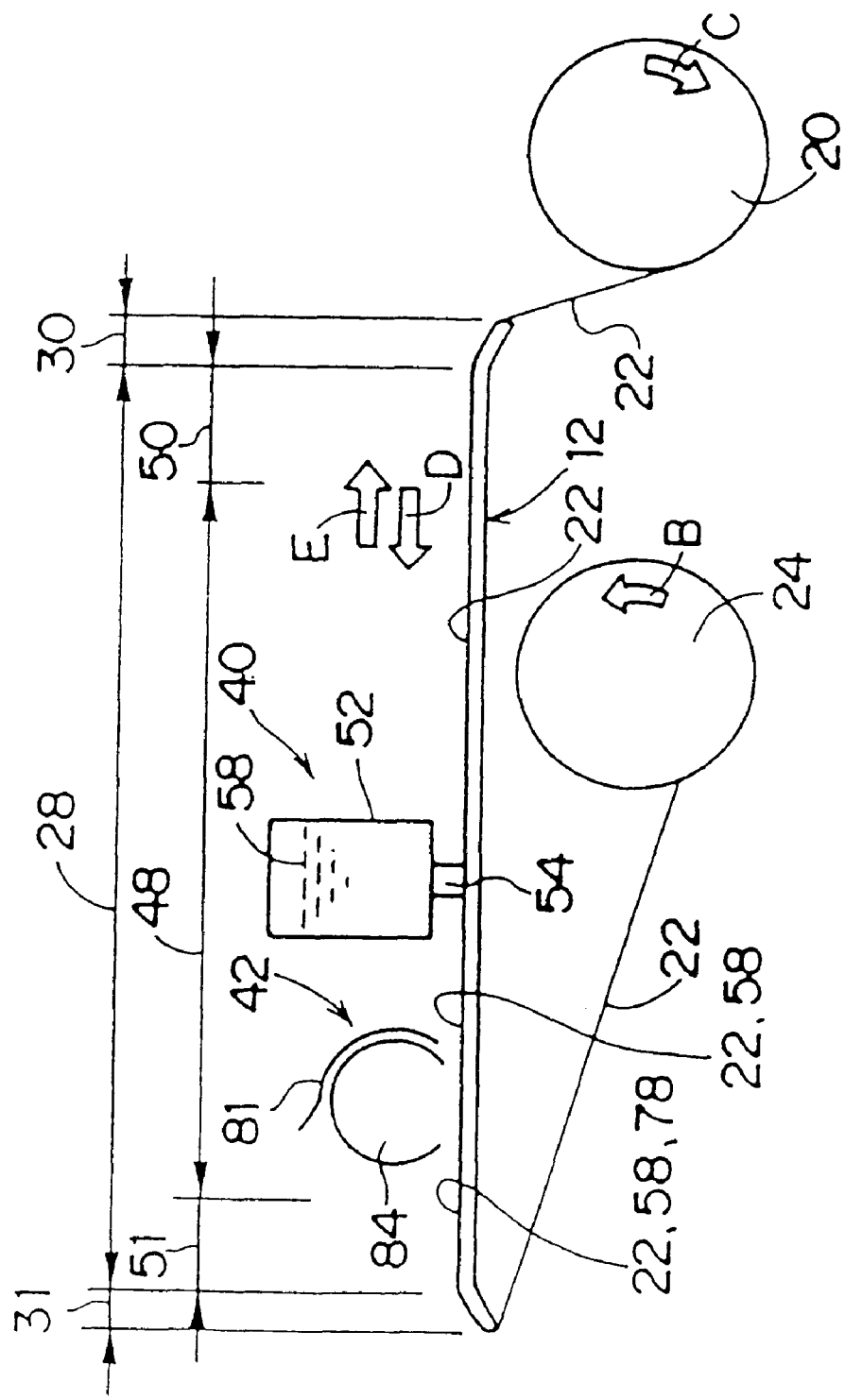
FIG. 9 is a view corresponding to FIG. 3 and illustrating an application process of an application unit after FIG. 3.
Figure 10:
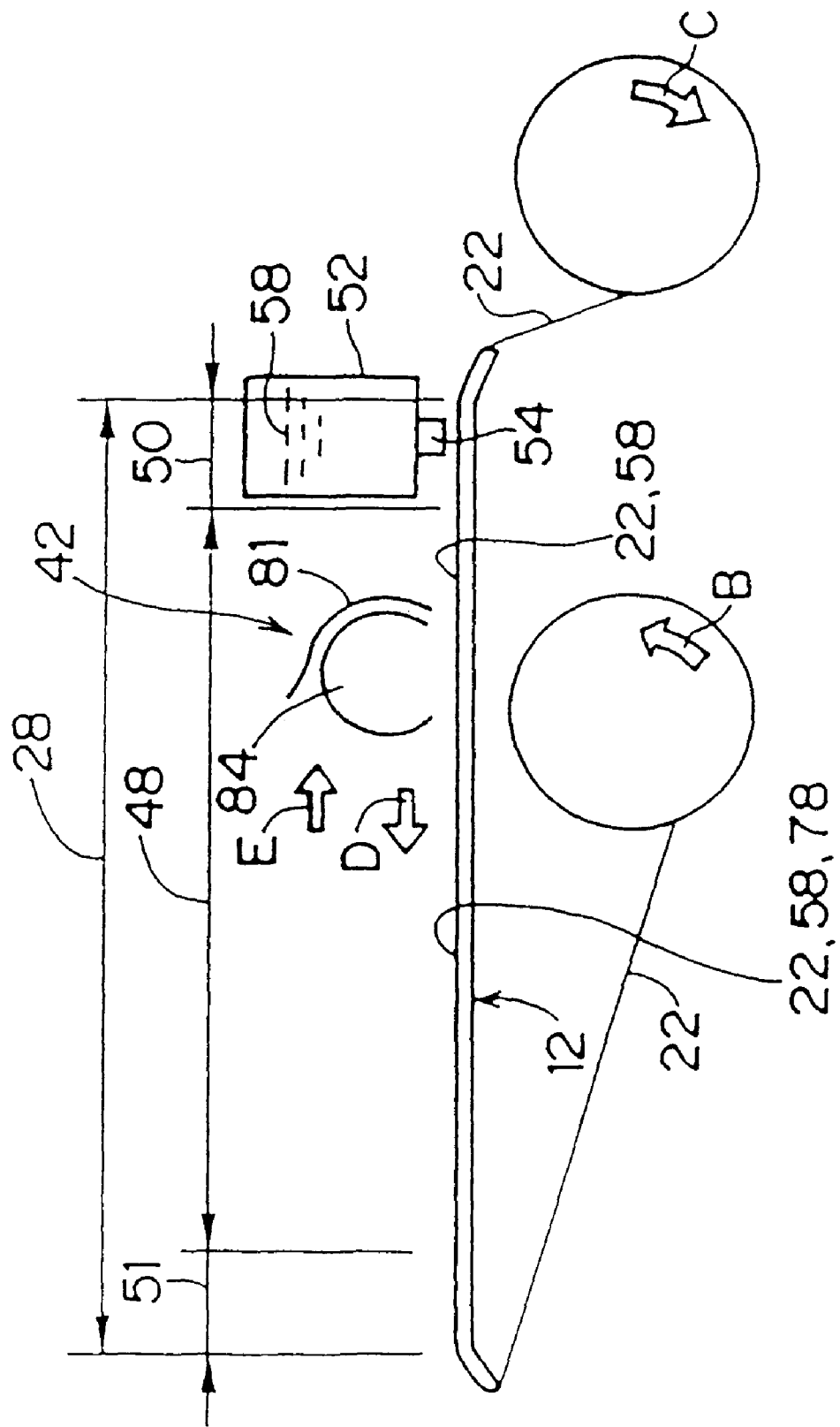
FIG. 10 is a view corresponding to FIG. 3 and illustrating an application process of an application unit after FIG. 9.

After the sponge 54 contacts the photosensitive material 22, the advance of the application unit 40 begins again. With the sponge 54 contacting the photosensitive material 22, the application unit 40 enters into the image region 48 from the front region 51, and moves through the image region 48 (as illustrated in FIG. 9). When the sponge 54 reaches the rear region 50, the solenoids are operated (UP). The sponge 54 is raised together with the tank 52 (as shown in FIG. 10) so that the sponge 54 separates from the photosensitive material 22 and contact of the sponge 54 and the photosensitive material 22 is stopped. The advance of the application unit 40 continues even while the contact of the sponge 54 and the photosensitive material 22 is being stopped. Thereafter, the application unit 40 is moved to the stop position and is stopped thereat.

Because the first contact of the sponge 54 to the photosensitive material 22 and the cessation of contact are not carried out in the image region 48, stable application is possible in the image region 48. More specifically, the sponge 54 begins to contact the photosensitive material 22 in the front region 51 of the photosensitive material 22. Due to this contact, the water 58 flows out. The sponge 54 moves along the photosensitive material 22 while contacting the photosensitive material 22 so as to apply the water 58 thereto. Thereafter, the sponge 54 stops contacting the photosensitive material 22 in the rear region 50 of the image region 48, and the water 58 no longer flows out. When the sponge 54 first contacts the photosensitive material 22 and when the sponge 54 stops contacting the photosensitive material 22, there is uneven application, i.e., uneven application (water dripping down or the like) due to uneven speed or the like at the time of the start of contact and the time of the end of contact. Therefore, the amount of the solvent for image formation which flows out is unstable. However, in the present invention, the start of contact takes place in the front region 51 and the end of contact takes place in the rear region 50. Therefore, the regions in which there is uneven application are the front region 51 and the rear region 50. Uneven application does not occur in the image region 48, and the amount of the solvent for image formation which flows out is uniform and stable. Accordingly, uniform and stable application in the image region 48 is made possible, and recording of images of high image quality can be achieved. Further, because the sponge 54 contacts the photosensitive material 22 in the range of the planar portion 28 of the stage 12, flow of the applied water 58 toward the front and the rear of the photosensitive material 22 and adverse effects associated with such flow are avoided.

The advance (CW) of the superposing unit 42 begins while the advance of the application unit 40 is temporarily stopped for the sponge 54 to contact the photosensitive material 22. As the superposing unit 42 begins to advance, the image-receiving material 78 is superposed on the photosensitive material 22. When superposing stops, the superposing unit 42 reaches the stop position and is stopped thereat.

At this time, the image-receiving material 78 is superposed on the photosensitive material 22 while water applied by the application unit 40 is squeezed.

After the superposing unit 42 stops at the stop position, the superposing unit 42 does not move for a predetermined period of time, and heat development transfer occurs.

After heat development transfer, the predetermined length of the photosensitive material 22 is pulled and conveyed (CW) by the second roller 24. The photosensitive material 22, together with the image-receiving material 78, is discharged off of the stage 12 from the rear end thereof.

As the photosensitive material 22 and the image-receiving material 78 are discharged, the image-receiving material 78 is peeled from the photosensitive material 22. The image receiving material 78 passes a peeling roller 86 which is at the rear side of the rear end of the stage 12, and is stacked in a discharge tray 88 which is at the rear side of the peeling roller 86. The portion of the photosensitive material 22 for which heat development transfer has been completed is inverted, and is positioned on an incline between the rear end of the stage 12 and the second roller 24.

The application surface of the portion of the photosensitive material 22, for which heat development transfer has been completed and which is positioned between the second roller 24 and the rear end of the stage, faces downward. In this way, the water 58 can fall downward without remaining on the photosensitive material 22. Adverse effects, which are caused by water remaining on the photosensitive material 22 when the photosensitive material 22 is rewound as will be described later and the portion for which heat development transfer has been completed returns to the top of the stage 12, are avoided.

Thereafter, the exposure unit 38, the application unit 40 and the superposing unit 42 are respectively withdrawn (CCW) from their stop positions to their standby positions with the superposing unit 42 being withdrawn first, so as to be ready for the subsequent exposure, application, and superposing.

Next, the predetermined length of the photosensitive material 22 is rewound onto the first roller 20. The image region 48 which has been exposed and for which heat development transfer has been completed is thereby positioned on the stage 12. In this way, there will be no adverse effects even if outside light from the document stand 32 reaches the photosensitive material 22 or a similar situation occurs. Light fogging of the unexposed portion of the photosensitive material at a region off of the stage 12 is prevented.

Exposure onto the photosensitive material 22, application of water, superposing of the image-receiving material 78, and heat development transfer onto the image-receiving material 78 are all carried out at a common stage 12.

In accordance with the above-described structure, exposure onto the photosensitive material 22, application of the water 58, superposing of the image-receiving material 78 on the photosensitive material 22, and heat development transfer all occur at a common stage 12, and an image is obtained on the image-receiving material 78.

Because the stage 12 is used in common for the respective processes, there is no need to provide separate stages as in the conventional art, and the apparatus can be made more compact. More specifically, conveying means between stages, e.g., rollers or the like, are not needed so that fewer parts can be used and manufacturing costs decrease. Further, the conveying distance is shortened and the processing speed is made faster.

The heat for the water 58 when the water 58 is applied and the heat needed for heat development transfer are obtained by heating the stage 12. As the heating means can be used in common, energy can be conserved and the apparatus can be made even more compact.

The temperature of the photosensitive material 22, which is exposed in a slit-shaped form by the exposure unit 38, is raised to and maintained at a constant temperature due to the photosensitive material 22 being held at the stage 12. Therefore, even if the ambient temperature varies, the photosensitive material is exposed at a constant temperature. Accordingly, variations in color density and color balance of the photosensitive material 22 are reduced, and a stable image of high image quality can be obtained.

The exposure unit 38 moves and successively scan-exposes the photosensitive material 22. The application unit 40 moves from the rear side of the exposure unit 38 and successively applies water to the photosensitive material 22. The superposing unit 42 moves from the rear side of the application unit 40 so that the image-receiving material 78 is successively superposed on the photosensitive material 22, and then heat development transfer is carried out. Here, because the superposing unit 42 moves from the rear side of the application unit 40 and successively superposes the image-receiving material 78 on the photosensitive material 22, squeezing after the application of the water can be effected by the superposing of the image-receiving material 78 on the photosensitive material 22. Therefore, there is no need to, for example, drive a squeeze roller separately.

Further, in the above-described embodiment, the superposing unit 42 instantaneously follows the application unit 40. The application unit 40 applies water, and at the rear side of the application unit 40, the superposing unit 42 carries out superposing. However, the times at which the application unit 40 and the superposing unit 42 begin to move are not limited to the above description and the following structure may be used. For example, after the exposure unit 38 completes exposure of one image, the application unit 40 begins to move. After the application unit 40 finishes applying water to one image, the superposing unit 42 starts to move. Alternatively, the application unit 40 may instantaneously follow the exposure unit 38. The exposure unit 38 effects exposure, and at the rear side thereof, the application unit 40 carries out application. As yet another alternative, the exposure unit 38, the application unit 40 and the superposing unit 42 may all be moved instantaneously so that the exposure unit 38 effects exposure, and at the rear side thereof, the application unit 40 carries out application, and at the rear side thereof, the superposing unit 42 carries out superposing.

Regardless of the above-described times, the time at which the application unit 40 begins to move can be freely set to an appropriate time after the start of movement of the exposure unit 38. Further, regardless of the above-described times, the time at which the superposing unit 42 begins to move also can be freely set to an appropriate time after the start of movement of the application unit 40.

However, by moving the respective units 38, 40, 42 instantaneously, e.g., by having the superposing unit 42 instantaneously follow the application unit 40, the processing time can be shortened. Further, because the single drive source is used in common by the respective units 38, 40, 42, the apparatus can be made compact.

In the above-described embodiment, light is irradiated linearly onto the document 34 so as to scan-expose the photosensitive material 22. However, the present invention is not limited to the same, and light may be irradiated to the entire surface of the document so that the light is planarly exposed onto the photosensitive material. Moreover, in the above-described embodiment, although the light exposed onto the photosensitive material 22 is reflected light which has been reflected by the document, the present invention is not limited to the same, and transmitted light which has been transmitted through a document may be used. More specifically, the document may be a reflecting document or a transmitting document. In this way, when the document is a reflecting document or a transmitting document, so-called analog exposure is effected. However, the present invention is not limited to the same, and scan-exposing a light beam onto the photosensitive material on the basis of an image signal, i.e., so-called digital exposure, is also possible.

In the above embodiment, the photosensitive material 22 is wound in a roll form, and a predetermined length thereof is pulled out and supplied onto the stage 12. However, the present invention is not limited to the same, and cut sheets which have been cut to predetermined lengths may be used. Further, the image-receiving material is not limited to cut sheets as in the above embodiment. The image-receiving material may be wound in roll form, pulled out to a predetermined length, and then cut.

The superposing of the image-receiving material 78 on the photosensitive material 22 need not be effected by the superposing unit 42 of the embodiment, and may be carried out manually or by some other means. Further, peeling of the photosensitive material 22 and the image-receiving material 78 may be carried out by using a pawl. The image forming solvent is not limited to water, and another transfer assistant may be used. The application portion for applying the image forming solvent is not limited to a sponge, and felt or the like may be used. Any material may be used provided that it absorbs and holds water from within the tank and permits the water to flow out due to contact with the photosensitive material 22. Application is not limited to use of the application unit provided with the sponge 54, and a roller or a brush may be used.

[Second Embodiment]

Figure 11:
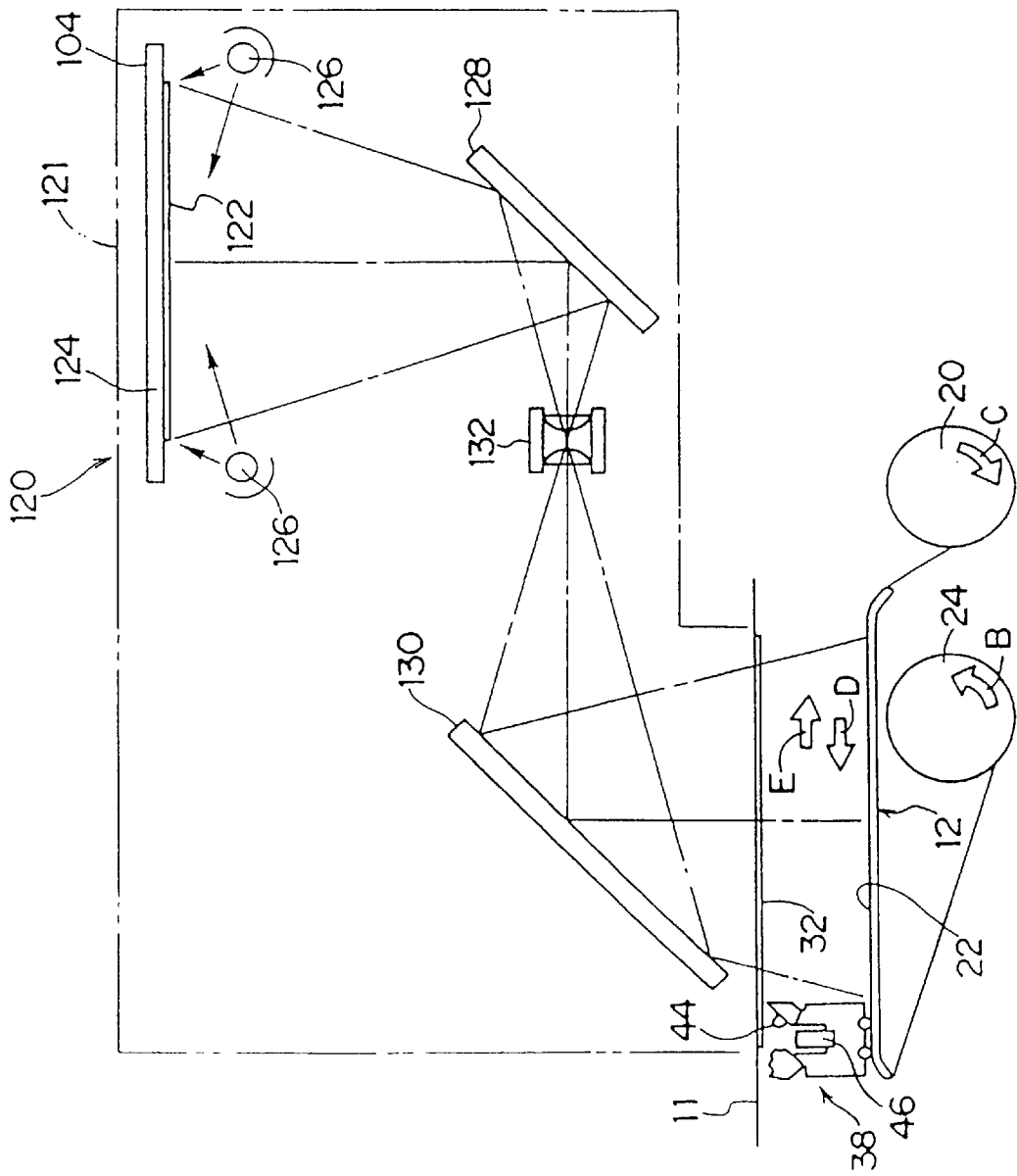
FIG. 11 is a view illustrating a planar-exposure means in an image recording apparatus of a second embodiment.

Next, a second embodiment of the present invention will be described on the basis of FIG. 11.

In the present embodiment, a planar-exposure means 120 is provided at the document stand 32 so as to be freely attachable thereto and removable therefrom. The planar-exposure means 120 includes a document holding portion 124 and an optical system, within a housing 121 provided at the base stand top surface 11 so as to oppose the stage 12. The document holding portion 124 holds a document 122 horizontally. The optical system includes light sources 126 positioned at both sides below the document 122, mirrors 128, 130, and a lens 132 positioned between the mirror 128 and the mirror 130.

In a case in which the planar-exposure means 120 is attached, there is no document 34 from the document stand 32. When the exposure unit 38, the application unit 40, and the superposing unit 42 are positioned at the standby positions (withdrawn positions at which the respective units 38, 40, 42 do not obstruct the planar-exposure), light is irradiated from the light sources 126 to the entire surface of the document 122, and the irradiated light is reflected by the document 122. The reflected light is refracted at the mirror 128 so that the optical axis changes from vertically downward to horizontal. The reflected light whose optical axis has been made horizontal is transmitted through the lens 132, is refracted by the mirror 130 so that the optical axis thereof is directed vertically downward, is transmitted through the document stand 32, and planarly exposes the photosensitive material 22 on the stage 12.

When the planar-exposure means 120 is not attached, as described previously, a document 34 is held by the document stand 32, the exposure unit 38 is moved, and scan-exposure is possible.

In the above-described planar-exposure means 120, the image of the document 122 is planarly exposed onto the photosensitive material 22 at equal magnification. However, the present invention is not limited to the same, and the image of the document 122 may be planarly-exposed onto the photosensitive material 22 at variable magnification.

Figure 12:
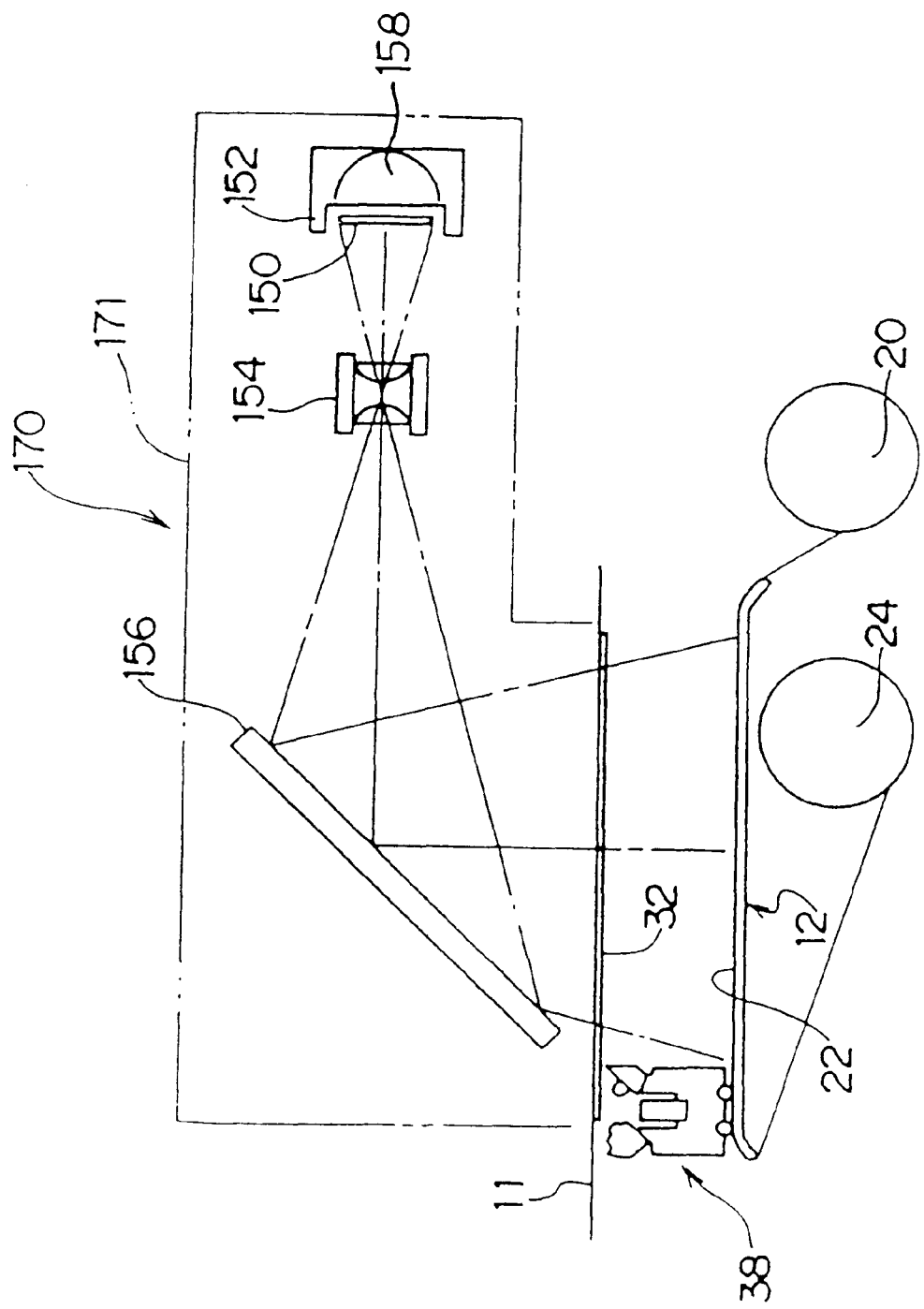
FIG. 12 is a view of another planar-exposure means.

As an example of varying the magnification, a planar-exposure means 170 illustrated in FIG. 12 may be used. A housing 171 of the planar-exposure means 170 is provided at the base stand top surface 11 so as to oppose the stage 12. A document holding portion 152 holds a document 150 vertically. A light source 158 irradiates light horizontally, i.e., parallel to the stage 12, to the entire surface of the document 150. The irradiated light is transmitted through the document 150, then is transmitted through a lens 154, is refracted at a mirror 156 so that the optical axis thereof is changed from horizontal to vertically downward, is transmitted through the document stand 32, and is planarly exposed onto the photosensitive material 22 on the stage 12.

Figure 13:
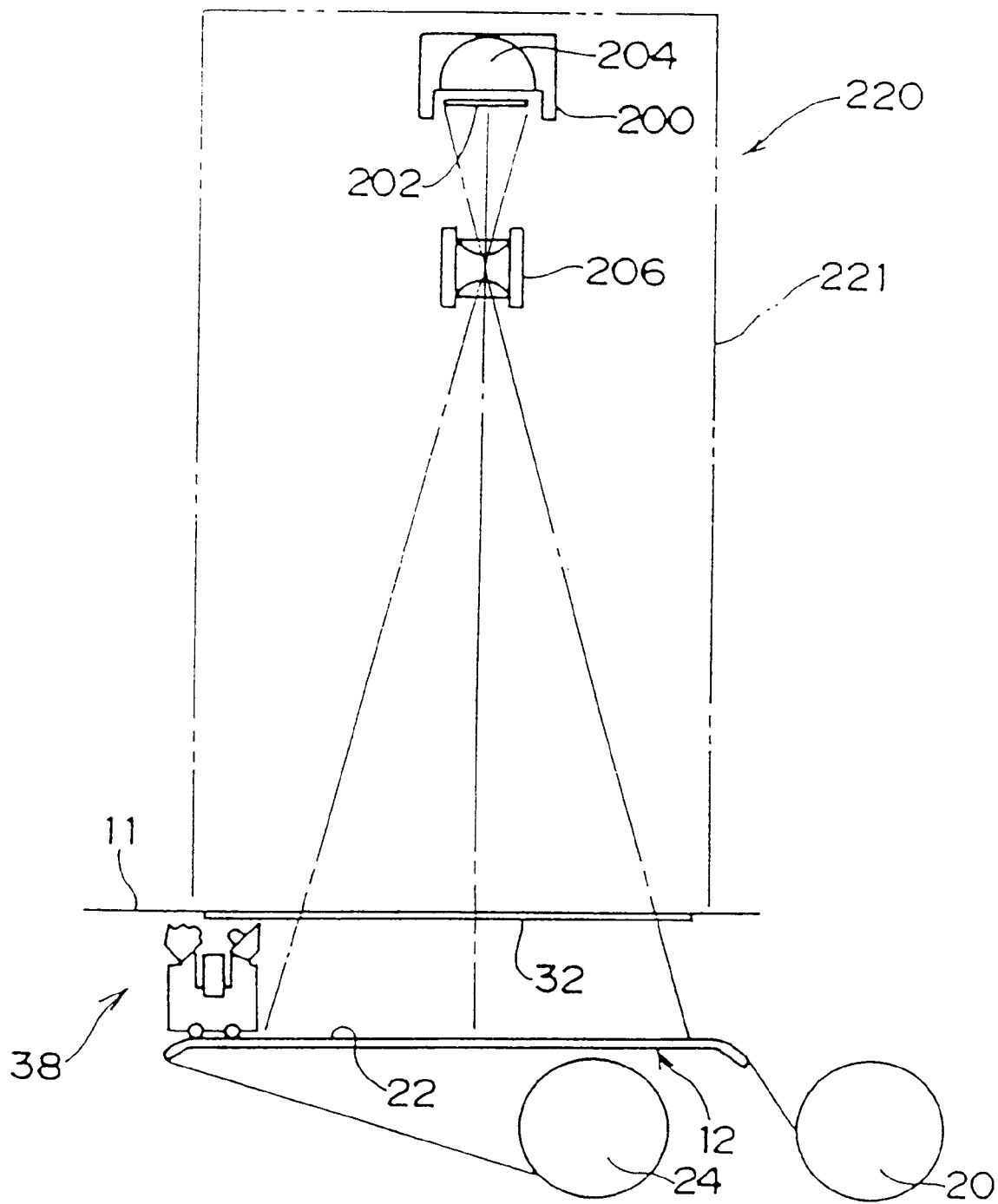
FIG. 13 is a view of yet another planar-exposure means.

As another example of varying the magnification, a planar-exposure means 220 illustrated in FIG. 13 may be used. A housing 221 of the planar-exposure means 220 is provided at the base stand top surface 11 so as to oppose the stage 12. A document holding portion 200 holds a document 202 horizontally. A light source 204 irradiates light vertically downward to the entire surface of the document 202. The irradiated light is transmitted through the document 202, and then through a lens 206 and then through the document stand 32, and is planarly exposed onto the photosensitive material 22 on the stage 12.

The document 150 at the planar-exposure means 170 and the document 202 at the planar-exposure means 220 are transmitting documents, as opposed to the document 122 at the planar-exposure means 120 which is a reflecting document. When a transmitting document is used, either a positive type or a negative type can be used.

Structures other than the planar-exposure means 120, 170, 220 are the same as those in the previously-described first embodiment.

In accordance with the above-described structure, when the planar-exposure means 120, 170, 220 are not attached, the exposure unit 38 moves between the document 34 of the document stand 32 and the photosensitive material 22 of the stage 12 so that scan-exposure is possible. The operational effects in this case are the same as those of the first embodiment.

When the planar-exposure means 120, 170, 220 are attached, with the exposure unit 38 at its withdrawn position, the light from the light sources 126, 158, 204 is irradiated to the entire surfaces of the documents 122, 150, 202 of the document holding portions 124, 152, 200. The irradiated light is transmitted through the documents 150, 202 or is reflected by the document 122, is transmitted through the optical systems, and planarly exposes the documents 122, 150, 202 of the document holding portions 124, 152, 200 onto the photosensitive material 22 on the stage 12.

In this way, the exposure stage is used commonly for both scan-exposure and planar-exposure. Scan-exposure and planar-exposure can both be realized simply at a low cost.

Other structures and operational effects of the second embodiment are the same as those of the first embodiment.

[Third Embodiment]

Hereinafter, a third embodiment of the image recording apparatus relating to the present invention will be described on the basis of FIGS. 2, 5 and 14 through 21. Members which are the same as those of the first embodiment are denoted by the same reference numerals, and description thereof is omitted.

Figure 14:
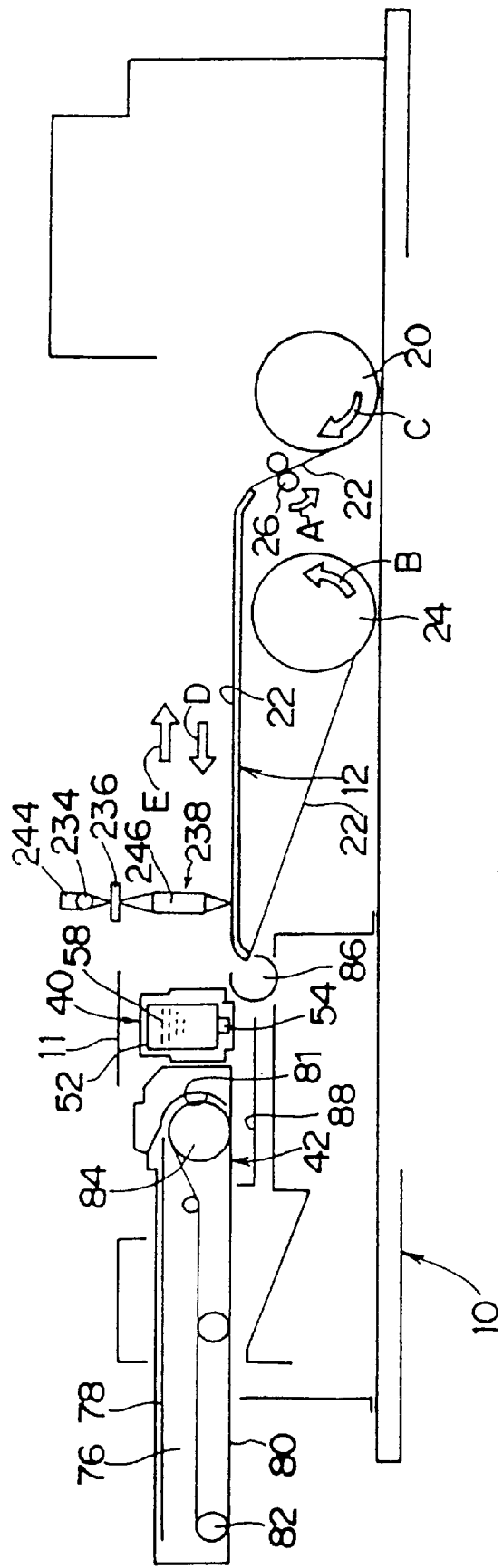
FIG. 14 is a front view illustrating an image recording apparatus relating to a third embodiment of the present invention.

As illustrated in FIG. 14, an exposure unit 238, the application unit 40 and the superposing unit 42 are respectively provided in the present apparatus. The respective units 238, 40, 42 are freely movable reciprocally above the stage 12 along the front-and-back directions of the stage 12. As a result, the units 238, 40, 42 can advance (the advancing direction is the direction of arrow E) from standby positions (the positions illustrated in FIG. 14), which are disposed in order from the rear end of the stage 12 and extend to a region off of the stage 12, to stop positions (the positions illustrated in FIG. 18) which are disposed in order. Conversely, the respective units 238, 40, 42 can withdraw (the withdrawing direction is the direction of arrow D) from the stop positions to the standby positions.

First, the exposure unit 238 which is the exposure means is positioned above the stage 12 toward the left side in FIG. 14.

Figure 16:
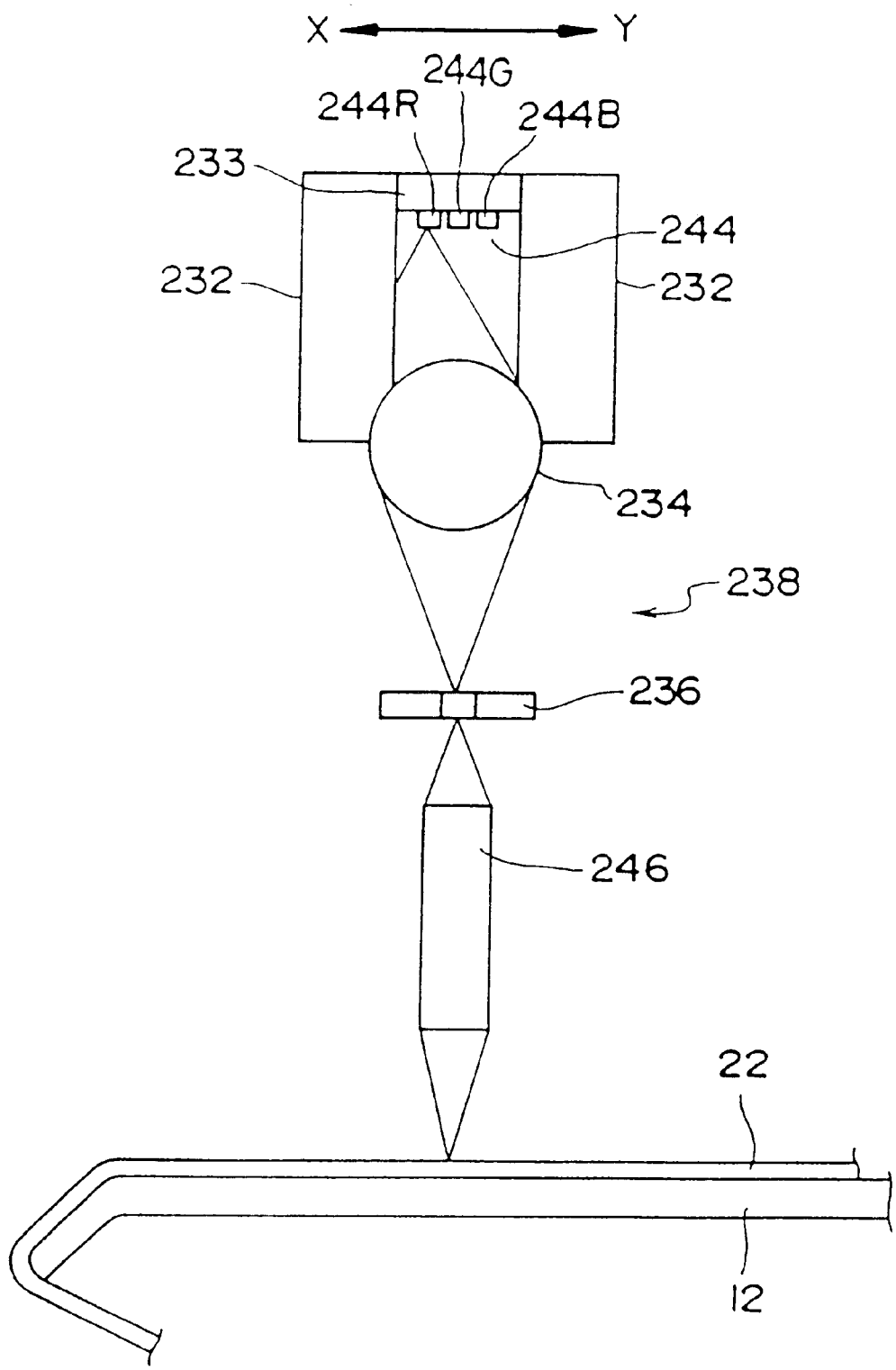
FIG. 16 is an overall schematic structural view of an exposure unit.

As shown in FIG. 16, the upper portion of the exposure unit 238 is structured by a pair of covers 232 which are disposed so as to oppose each other, separated from each other in the horizontal direction (XY direction). The top end portion of the cavity portion formed by the pair of covers 232 is closed by a supporting member 233 which is interposed between the pair of covers 232. The longitudinal direction of the supporting member 233 (e.g., a direction substantially orthogonal to the XY direction) corresponds to a one line direction of the photosensitive material 22 which is the transverse direction of the photosensitive material 22.

A plurality of light-emitting diodes (hereinafter, "LEDs") are provided at the bottom surface of the supporting member 233.

Figure 17:
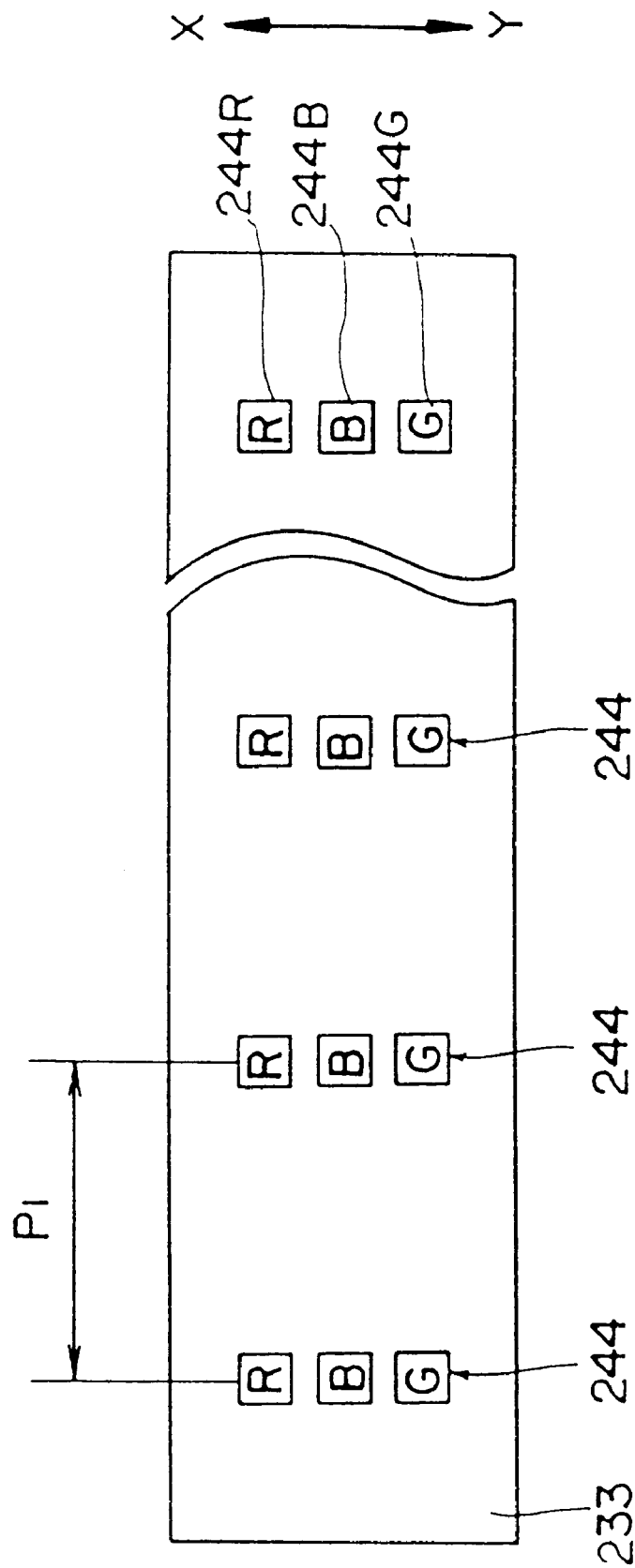
FIG. 17 is a view illustrating an arrangement of LEDs.
Figure 18:
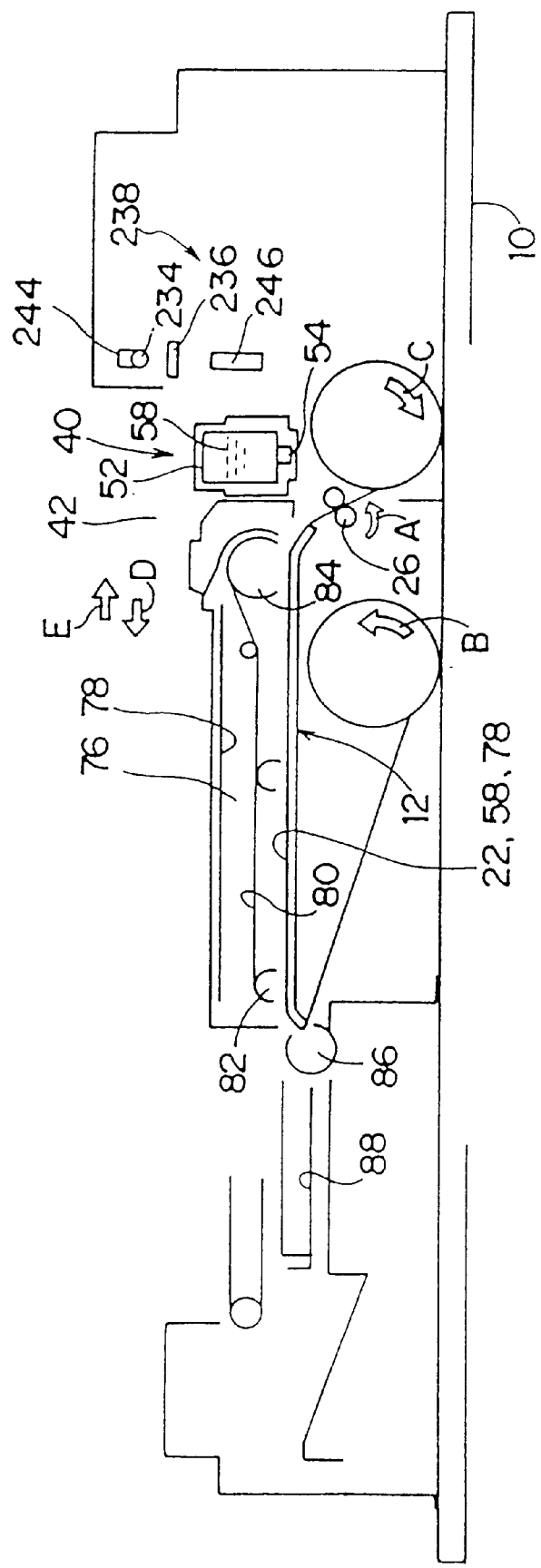
FIG. 18 is a view corresponding to FIG. 14 at the time that respective units are at stop positions.
Figure 19:
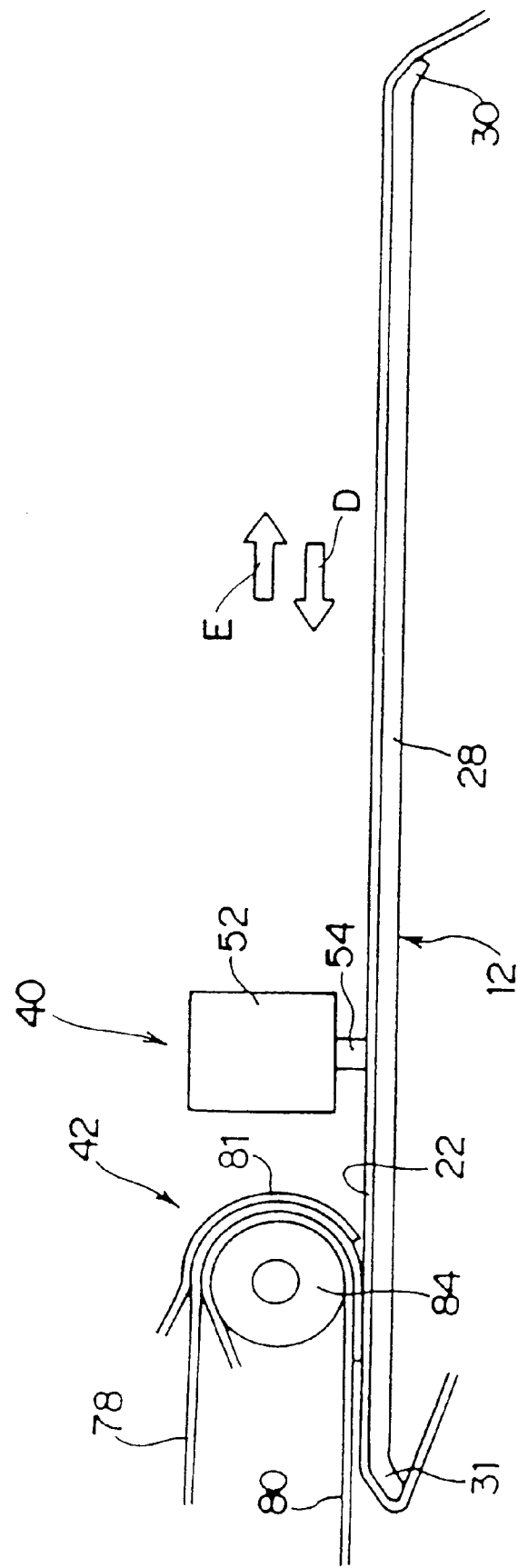
FIG. 19 is a view illustrating a process of a superposing unit superposing an image-receiving material onto a photosensitive material on the stage.

As illustrated in FIG. 17, an LED 244R emitting red light (R light), an LED 244B emitting blue light (B light), and an LED 244G emitting green light (G light) are provided adjacently along a direction which is orthogonal to the one line direction of the photosensitive material 22. A light-emitting element group 244 is formed by the LED 244R, the LED 244B and the LED 244G. The light-emitting element groups 244 are disposed in a row at predetermined pitches $P_1$ (usually about 3 mm) along the one line direction of the photosensitive material 22.

A cylindrical lens 234 is mounted to the bottom end portion of the cavity portion (see FIG. 16). The axial direction of the cylindrical lens 234 is disposed parallel to the longitudinal direction of the supporting member 233 (the one line direction of the photosensitive material 22). The lights emitted from the LEDs 244R, the LEDs 244G and the LEDs 244B are slit-shaped beams in a direction along the one line direction of the photosensitive material 22.

Further, the LEDs 244R, the LEDs 244G and the LEDs 244B are respectively connected to the control device 100. The lighting timing of the respective LEDs is controlled by the control device 100.

A liquid crystal light shutter array 236 is provided beneath the cylindrical lens 234 (see FIG. 16). The liquid crystal light shutter array 236 is formed such that liquid crystal cells, which serve as a plurality of light shutter elements corresponding to the pixels forming a pixel row of one line of the photosensitive material 22, are aligned in a direction corresponding to the longitudinal direction of the slit-shaped beam.

The liquid crystal light shutter array 236 is connected to the control device 100. When voltage is applied to the plurality of liquid crystal cells from the control device 100, the liquid crystal cells open and the slit-shaped beam is transmitted therethrough. When voltage is no longer applied, the liquid crystal cells close and the slit-shaped beam is cut off. Note that the liquid crystal cells may be such that when voltage is no longer applied thereto, the liquid crystal cells open and cut off the slit-shaped beam, and when voltage is applied, the liquid crystal cells close and the slit-shaped beam is transmitted therethrough.

A SELFOC lens (lens array) 246 is provided under the liquid crystal light shutter array 236. The SELFOC lens 246 images on the photosensitive material 22 the slit-shaped beam transmitted through the liquid crystal cells.

As described above, the exposure unit 238 is equipped with the light-emitting element groups 244, the cylindrical lens 234, the liquid crystal light shutter array 236, the SELFOC lens 246 and the like. Due to the cylindrical lens 234, the light from the light-emitting element groups 244 becomes linear along a direction orthogonal to the moving direction of the exposure unit 238 (the front-and-back directions of the stage 12 which is the direction in which the exposure unit 238 moves relatively to the photosensitive material 22 in one direction), i.e., along a direction orthogonal to the surface of the drawing of FIG. 14. The irradiated light transmitted through the liquid crystal light shutter array 236 is irradiated in a slit-shaped form onto the photosensitive material 22 by the SELFOC lens 246.

As a result, due to the exposure unit 238 advancing from the standby position toward the stop position, the irradiated light transmitted through the liquid crystal light shutter array 236, whose opening and closing is controlled by the control device 100 and which is selectively opened and closed, is successively scan-exposed onto the photosensitive material 22 so that an image is formed.

Figure 21:
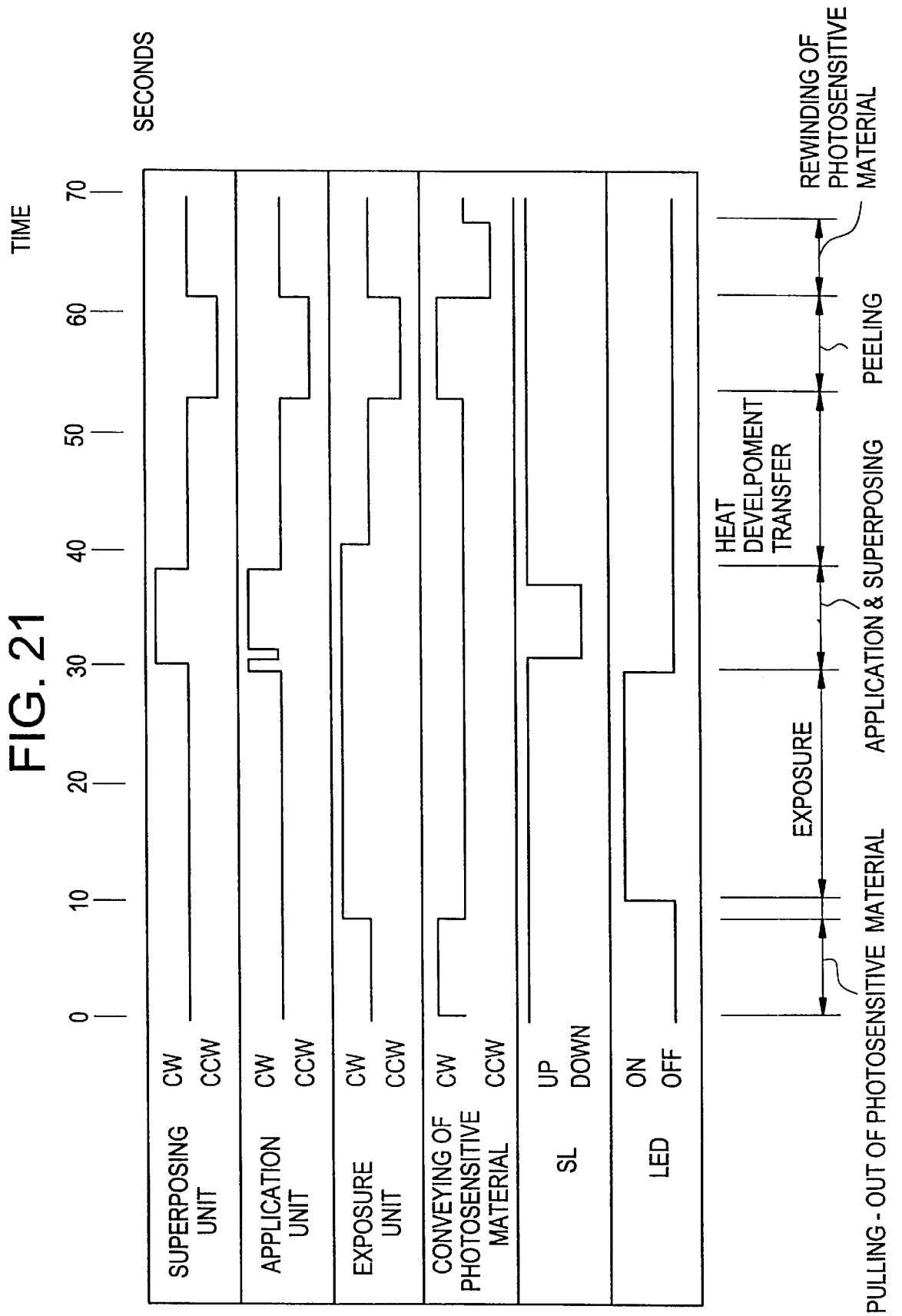

The overall operation of the present apparatus including the units 238, 40, 42 will be explained concretely hereinafter on the basis of the time chart of FIG. 21.

First, the photosensitive material 22 is conveyed (CW) such that a predetermined length thereof is pulled out onto and held at the stage 12.

Next, when the exposure unit 238 advances (CW) from the standby position toward the stop position and the photosensitive material 22 enters the image region 48, the light-emitting element groups 244 begin irradiating light (ON) and continue to irradiate light above the image region 48 so that the light is scan-exposed onto the photosensitive material 22.

More specifically, the control device 100 applies pulse voltage to the LEDs 244R for the predetermined time tR, to the LEDs 244G for the predetermined time tG, and to the LEDs 244B for the predetermined time tB, so that the LEDs 244R, the LEDs 244G, and the LEDs 244B emit light. In this way, R light, G light and B light are irradiated in succession from the LEDs 244R, the LEDs 244G, and the LEDs 244B, with the R light being irradiated for the time tR, the G light being irradiated for the time tG, and the B light being irradiated for the time tB. The successively irradiated R light, G light and B light are transmitted through the cylindrical lens 234 so as to become slit-shaped beams, and irradiate the liquid crystal light shutter array 236.

The control device 100 controls the opening and closing of the liquid crystal cells by applying a predetermined pulse voltage to the liquid crystal cells, so that the exposure amounts of the portions, which correspond to the photosensitive material 22, of the R light, G light and B light which have been transmitted through the liquid crystal cells of the liquid crystal light shutter array 236 and irradiated successively become substantially equal to the amounts of exposure of pixels corresponding to color image data stored in an unillustrated memory. As the exposure unit 238 moves, the respective lines of the photosensitive material 22 are exposed.

In this way, the exposure unit 238, which is movably supported, digitally exposes the image onto the photosensitive material 22.

When the exposure unit 238 moves past the image region 48 and enters into the rear region 50, the light-emitting element groups 244 stop irradiating light (OFF). Thereafter, the exposure unit 238 advances to the stop position with the light-emitting element groups 244 not irradiating light, and is stopped thereat.

When the light-emitting element groups 244 stop irradiating light, the application unit 40 begins to advance (CW).

Figure 15:
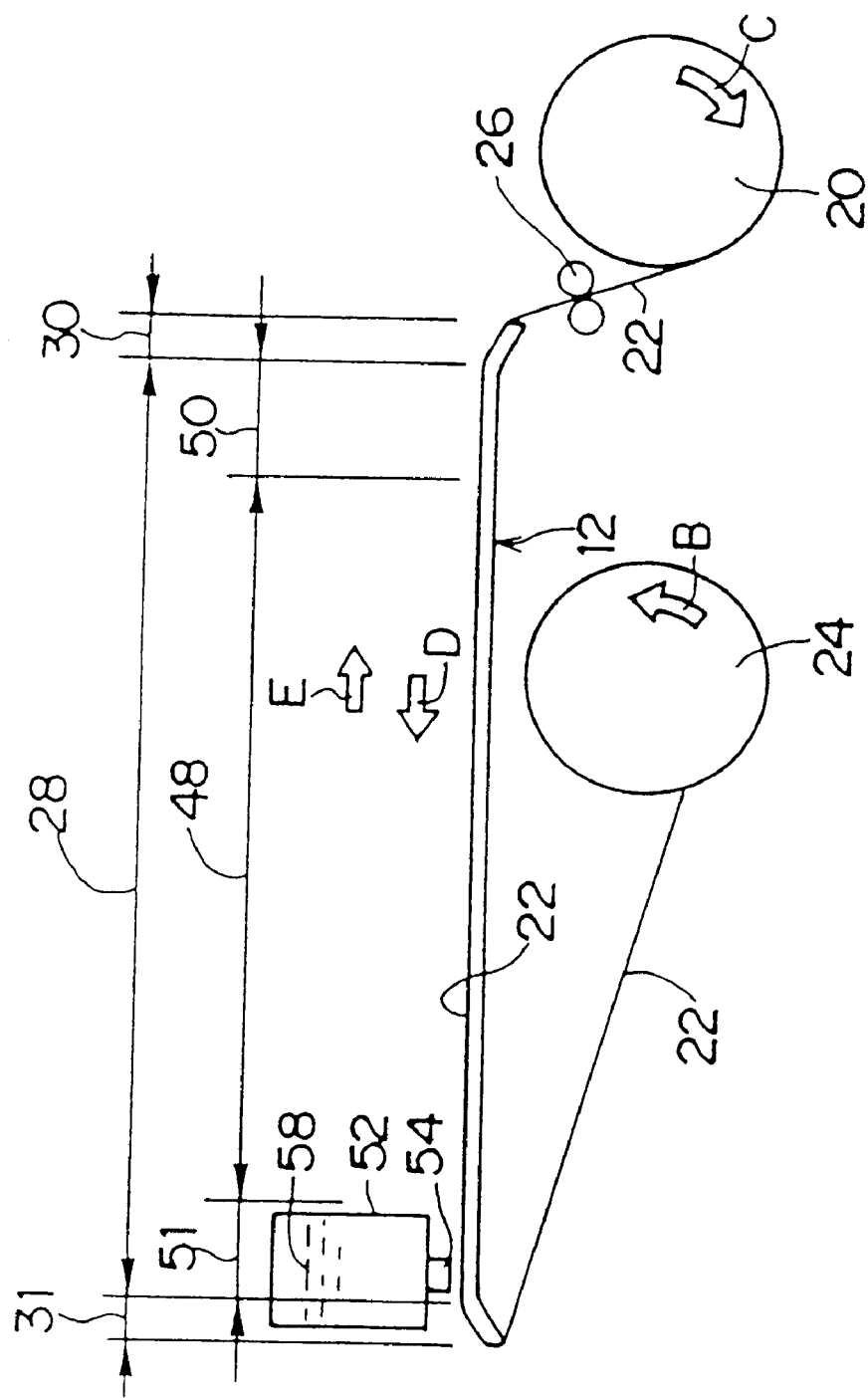
FIG. 15 is a view of a stage seen along front-and-back directions thereof.

The operation blocks 70 of the application unit 40 are originally at the raised positions such that the sponge 54 of the application unit 40 is separated from the photosensitive material 22. The application unit 40 enters the region above the stage 12, reaches the planar portion 28 from the inclined portion 31 at the rear end side of the stage 12, and is temporarily stopped at the front region 51 (as illustrated in FIG. 15). In this stopped state, the solenoids (SL) are operated (DOWN), so that the sponge 54 is lowered together with the tank 52 and contacts the photosensitive material 22.

After the sponge 54 contacts the photosensitive material 22, the advance of the application unit 40 begins again. With the sponge 54 contacting the photosensitive material 22, the application unit 40 enters into the image region 48 from the front region 51, and moves above the image region 48. When the sponge 54 reaches the rear region 50, the solenoids are operated (UP). The sponge 54 is raised together with the tank 52 so that the sponge 54 separates from the photosensitive material 22 and contact of the sponge 54 and the photosensitive material 22 is stopped. The advance of the application unit 40 continues even while the contact of the sponge 54 and the photosensitive material 54 is being stopped. Thereafter, the application unit 40 is moved to the stop position and is stopped thereat.

Because the first contact of the sponge 54 to the photosensitive material 22 and the cessation of contact are not carried out in the image region 48, stable application is possible in the image region 48. Further, because the sponge 54 contacts the photosensitive material 22 in the range of the planar portion 28 of the stage 12, flow of the applied water 58 toward the front and the rear of the photosensitive material 22 and adverse effects associated with such flow are avoided.

The advance (CW) of the superposing unit 42 begins while the advance of the application unit 40 is temporary stopped for the sponge 54 to contact the photosensitive material 22. As the superposing unit 42 begins to advance, the image-receiving material 78 is superposed on the photosensitive material 22. When superposing stops, the superposing unit 42 reaches the stop position and is stopped thereat. At this time, the image-receiving material 78 is superposed with the photosensitive material 22 while water applied by the application unit 40 is squeezed.

After the superposing unit 42 stops at the stop position, the superposing unit 42 does not move for a predetermined period of time, and heat development transfer occurs. After heat development transfer, the predetermined length of the photosensitive material 22 is pulled and conveyed (CW) by the second roller 24. The photosensitive material 22, together with the image-receiving material 78, is discharged off of the stage 12 from the rear end thereof.

Figure 20:
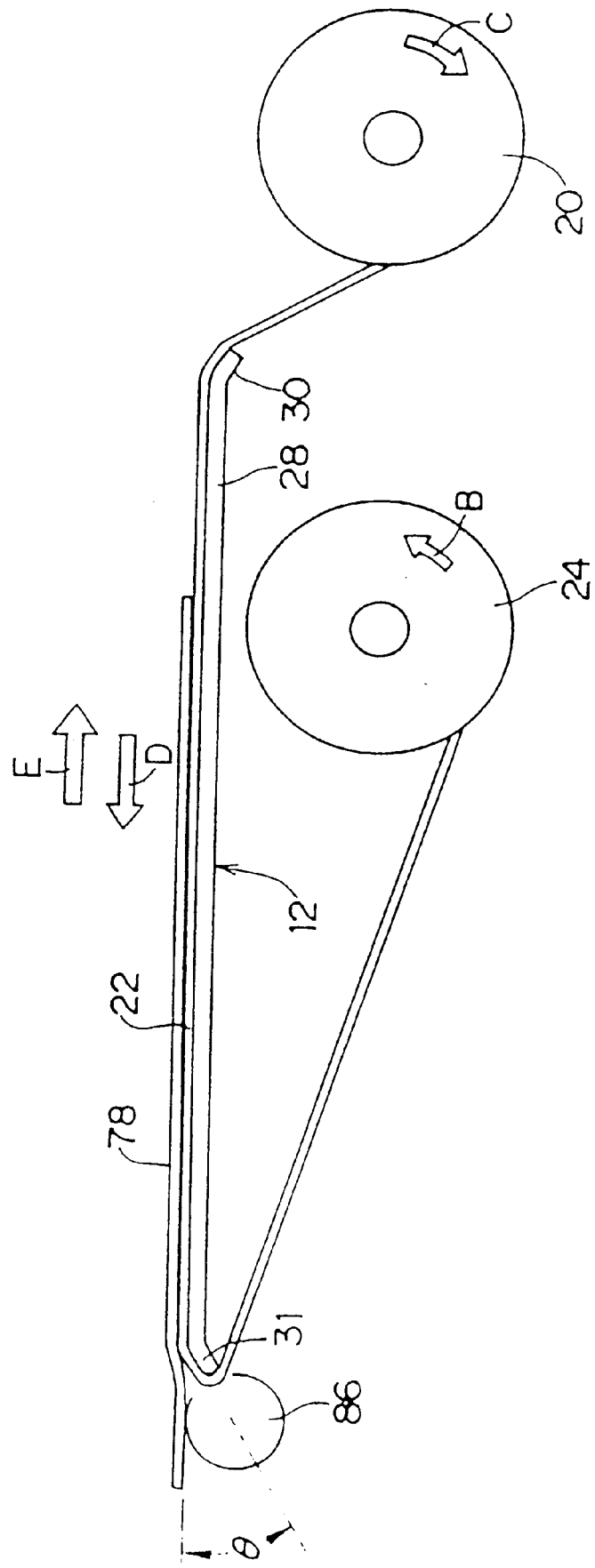
FIG. 20 is a view illustrating a process of peeling the photosensitive material and the image-receiving material when the photosensitive material and the image-receiving material are discharged off of the stage.

As the photosensitive material 22 and the image-receiving material 78 are discharged, as illustrated in FIG. 20, the image-receiving material 78 is peeled from the photosensitive material 22. The image receiving material 78 passes the peeling roller 86 which is at the rear side of the rear end of the stage 12, and is stacked in the discharge tray 88 which is at the rear side of the peeling roller 86. The portion of the photosensitive material 22 for which heat development transfer has been completed is inverted, and is positioned on an incline between the rear end of the stage 12 and the second roller 24.

More specifically, heat development transfer is carried out on the stage 12, and thereafter, the photosensitive material 22 is taken up and pulled at one end side of the stage 12. The photosensitive material 22 is conveyed off of the stage 12 from the one end side of the stage 12. At this time, the photosensitive material 22 is conveyed oppositely of the image-receiving material 78 (in a direction of separating from image-receiving material 78) with its orientation changed by an angle θ with respect to the upper surface (holding surface) of the planar portion 28 of the stage 12. In this way, the rigidity of the image-receiving material 78 overcomes the force of adhesion between the image-receiving material 78 and the photosensitive material 22, and the image-receiving material 78 and the photosensitive material 78 are peeled. While being peeled, the image-receiving material 78 and the photosensitive material 22 are both discharged off of the stage 12.

The angle θ is set appropriately in accordance with type, the thickness and the like of the image-receiving material 78, and in accordance with the type or the like of the photosensitive material 22. However, in considering an angle θ which allows the photosensitive material 22 to be pulled along the inclined portion 31 (and the inclined portion 30) and maintained planarly without rising off of the upper surface of the planar portion 28, the angle θ should not exceed 90 degrees, and is preferably 40 to 50 degrees.

Further, it is preferable that the region between the inclined portion 31 and the planar portion 28 and the region between the inclined portion 30 and the planar portion 28 are formed continuously with the planar portion 28 and the corresponding inclined portion 31, 30 in circular-arc shapes, so that the photosensitive material 22 is pulled along the inclined portion 31 (and the inclined portion 30) and is maintained planarly without rising off of the upper surface of the planar portion 28.

The application surface of the portion of the photosensitive material 22, for which heat development transfer has been completed and which is positioned between the second roller 24 and the rear end of the stage, faces downward. In this way, the water 58 can fall downward without remaining on the photosensitive material 22. Therefore, adverse effects, which are caused by water remaining on the photosensitive material 22 when the photosensitive material 22 is rewound as will be described later and the portion for which heat development transfer has been completed returns to the top of the stage 12, are avoided.

Thereafter, the exposure unit 238, the application unit 40 and the superposing unit 42 are respectively withdrawn (CCW) from their stop positions to their standby positions with the superposing unit 42 being withdrawn first, so as to be ready for the subsequent exposure, application, and superposing.

Next, the predetermined length of the photosensitive material 22 is rewound onto the first roller 20. In this way, the portion of the photosensitive material 22 which has been exposed and for which heat development transfer has been completed is positioned on the stage 12. Accordingly, even if outside light reaches the photosensitive material 22 or a similar situation occurs, because the unexposed portion of the photosensitive material 22 is positioned at a region off of the stage 12, light fogging is prevented. There is therefore no need for a mask to prevent fogging.

As described above, the exposure unit 238 is movably supported above the stage 12, and can digitally expose light in a slit-shaped form while moving above the photosensitive material 22 which is held by the stage 12.

As a result, at the stage 12, digital exposure can be performed in addition to the application of water 58, the superposing of the image-receiving material 78 on the photosensitive material 22, and the heat development transfer onto the image receiving material 78. Because the stage is used in common for various processes, there is no need to provide separate stages as in the conventional art, and the apparatus can be made compact. More specifically, the conveying means between stages, e.g., rollers or the like, are not needed so that fewer parts can be used and manufacturing costs decrease. Further, the conveying distance is shortened so that the processing speed is faster. More specifically, conveying means between stages, e.g., rollers or the like, are not needed so that fewer parts can be used and manufacturing costs decrease. Further, the conveying distance is shortened, and the processing speed is made faster.

The heat for the water 58 when the water 58 is applied and the heat needed for heat development transfer are obtained by heating the stage 12. As a result, the heating means can be used in common, energy can be conserved, and the apparatus can be made even more compact.

As described above, the exposure unit 238 moves and light is scan-exposed successively onto the photosensitive material 22. Then, the application unit 40 moves and water is successively applied to the photosensitive material 22. The superposing unit 42 moves from the rear side of the application unit 40 so that the image-receiving material 78 is successively superposed on the photosensitive material 22. Heat development transfer occurs, and an image is obtained on the image-receiving material 78.

Further, as the photosensitive material 22 is pulled and is discharged together with the image-receiving material 78 off of the stage 12, the photosensitive material 22 and the image-receiving material 78 are peeled automatically. As this peeling does not require a pawl, stable peeling is realized.

In the above-described embodiment, the superposing unit 42 instantaneously follows the application unit 40. The application unit 40 applies water, and at the rear side of the application unit 40, the superposing unit 42 carries out superposing. However, the times at which the application unit 40 and the superposing unit 42 begin to move are not limited to the above description and the following structure may be used. For example, after the exposure unit 238 completes exposure of one image, the application unit 40 begins to move. After the application unit 40 finishes applying water to one image, the superposing unit 42 starts to move.

However, by moving the respective units 238, 40, 42 instantaneously, e.g., by having the superposing unit 42 instantaneously follow the application unit 40, the processing time can be shortened. Further, because the single drive source is used in common by the respective units 238, 40, 42, the apparatus can be made compact.

In the above embodiment, the photosensitive material 22 is wound in a roll form, and a predetermined length thereof is pulled out and supplied onto the stage 12. However, the present invention is not limited to the same, and cut sheets which have been cut to predetermined lengths may be used. Further, the image-receiving material is not limited to cut sheets as in the above embodiment. The image-receiving material may be wound in roll form, pulled out to a predetermined length, and then cut.

The superposing of the image-receiving material 78 on the photosensitive material 22 need not be effected by the superposing unit 40 of the embodiment, and superposing may be carried out manually or by some other means. Further, peeling of the photosensitive material 22 and the image-receiving material 78 may be carried out by using a pawl. The image forming solvent is not limited to water, and another transfer assistant may be used. The application portion for applying the image forming solvent is not limited to a sponge, and felt or the like may be used. Any material may be used provided that it absorbs and holds water from within the tank and permits the water to flow out due to contact with the photosensitive material 22. Application is not limited to use of the application unit provided with the sponge 58, and a roller or a brush may be used.

In the present embodiment, the light-emitting element groups 244 formed by the plurality of LEDs are used as the light source. Instead of the light-emitting element groups 244, a halogen lamp or a fluorescent lamp may be used as the light source. Further, in place of the combination of the light-emitting element groups 244 and the liquid crystal light shutter array 236, a one-dimensional CRT which is a slit-shaped display, or the like may be used.

[Fourth Embodiment]

Next, a fourth embodiment of the image recording apparatus relating to the present invention will be described on the basis of FIG. 22. Members which are the same as those of the third embodiment are denoted by the same reference numerals, and description thereof is omitted.

Figure 22:
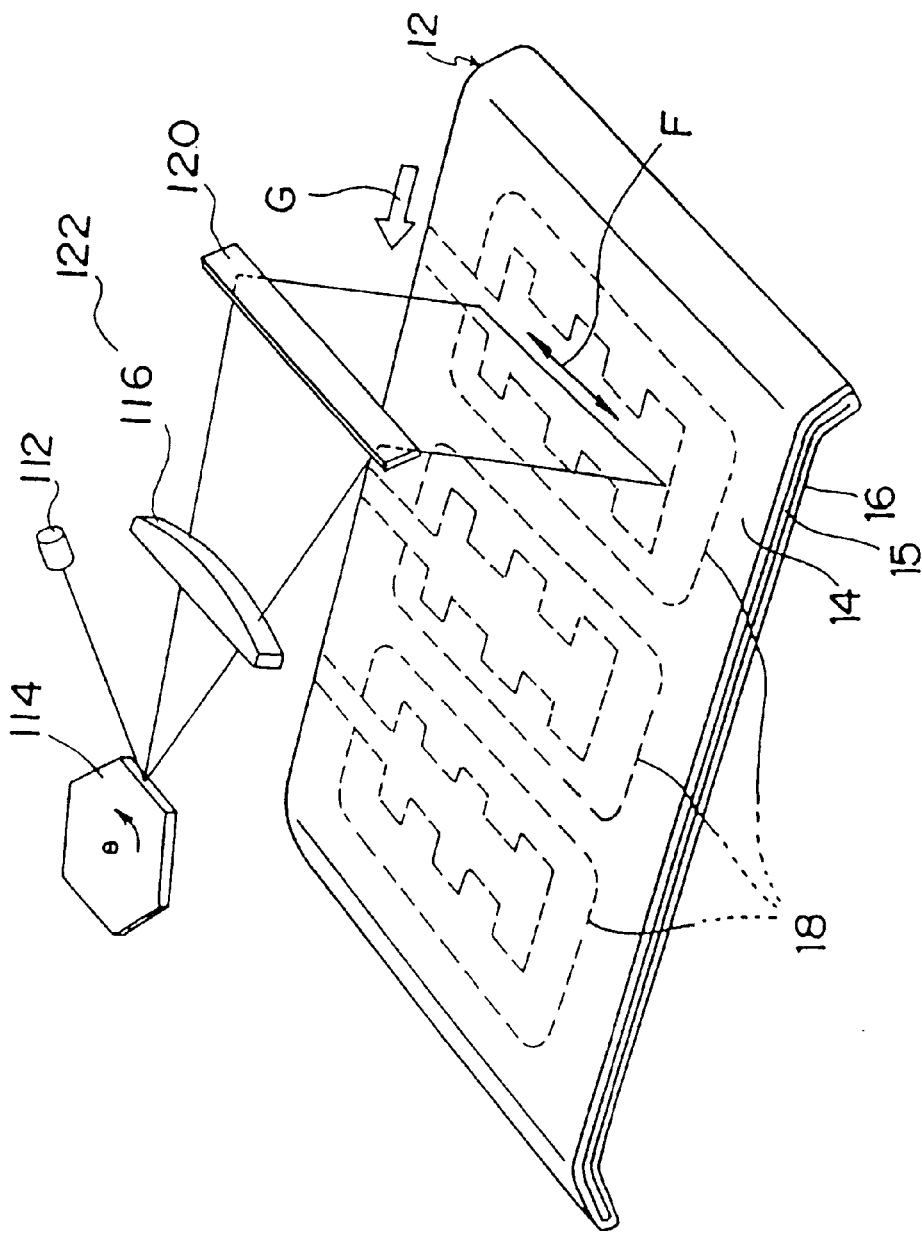
FIG. 22 is an enlarged view illustrating main portions of an image recording apparatus of a fourth embodiment.

In the present embodiment, as illustrated in FIG. 22, instead of the exposure unit 238, an exposure unit 122 is used as the exposure means. The exposure unit 122 is formed by a light source 112, a polygon mirror 114, an FE lens 116, and a mirror 120. The light source 112 is formed by laser diodes of three colors and generates light. The polygon mirror 114 reflects light from the light source 112 while rotating. The Fθ lens 116 converges the reflected light from the polygon mirror 114. The mirror 120 reflects the light transmitted through the Fθ lens 116, and irradiates the light on the stage 12 while main scanning in the direction of arrows F. The exposure unit 122 is disposed above the stage 12.

The photosensitive material 22 can be moved by the previously-described second roller 24 and nip rollers 26 along the direction of arrow G which is the sub-scanning direction which is orthogonal to the direction of arrows F.

Accordingly, when the exposure unit 122 and the photosensitive material 22 move relatively along the sub-scanning direction, the exposure unit 122 effects digital exposure from above the photosensitive material 22 while main-scanning in the direction orthogonal to the sub-scanning direction. As a result, high-speed digital exposure is possible by using the polygon mirror 114.

In the present embodiment, digital exposure is effected with the exposure unit 122 fixed and the photosensitive material 22 moving. However, conversely, digital exposure may be carried out with the photosensitive material 22 fixed and the exposure unit 122 moving in the sub-scanning direction. Further, in place of the exposure unit 122 of the present embodiment, a structure which combines LEDs and a lens for imaging may be used to effect point scan-exposure.

[Fifth Embodiment]

Next, a fifth embodiment of the image recording apparatus relating to the present invention will be described on the basis of FIG. 23. Members which are the same as those of the third embodiment are denoted by the same reference numerals, and description thereof is omitted.

Figure 23:
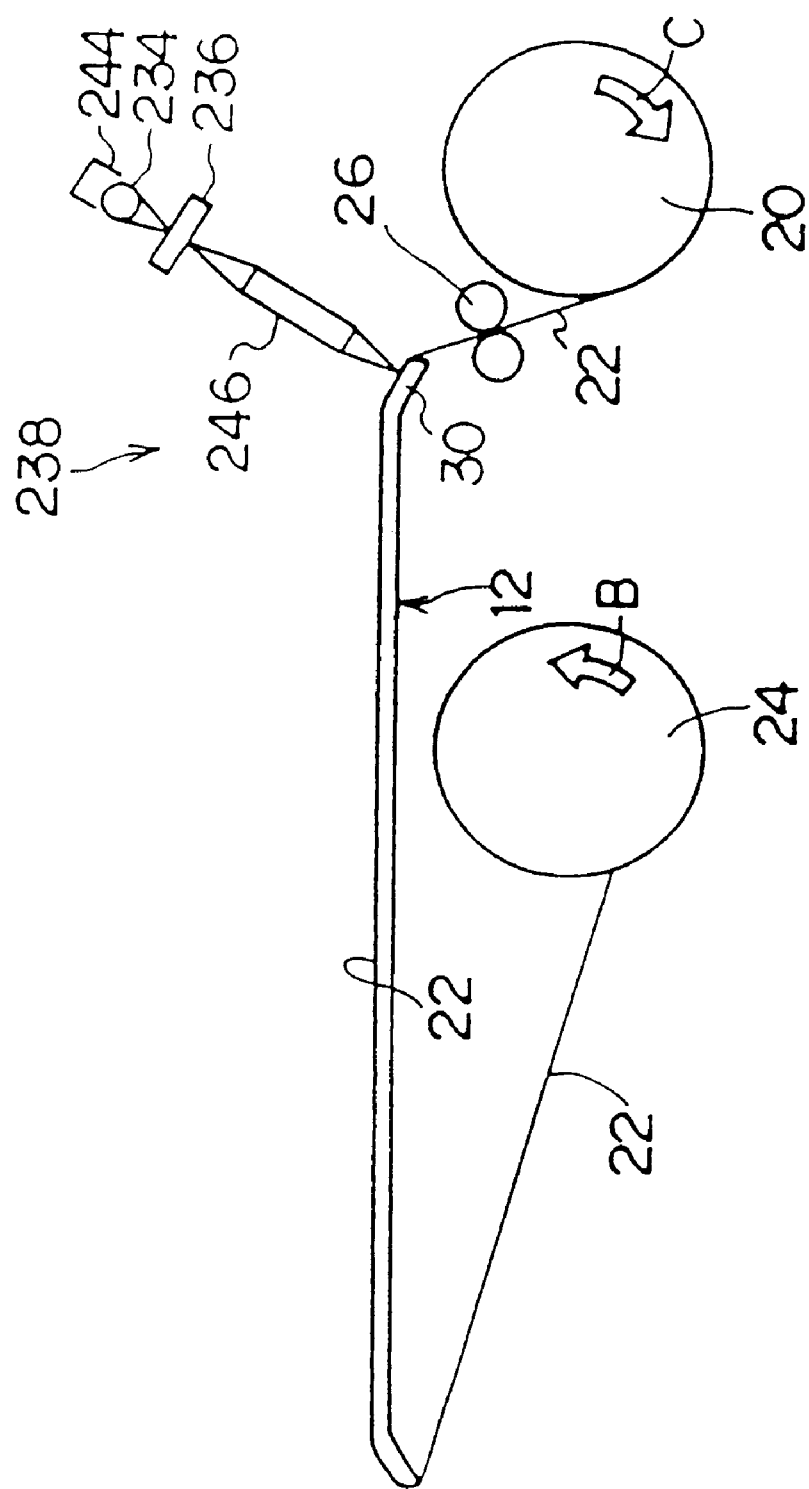
FIG. 23 is an enlarged view illustrating main portions of an image recording apparatus of a fifth embodiment.

As illustrated in FIG. 23, the present embodiment has the exposure unit 238 which is the same as that of the exposure unit 238 of the third embodiment. However, in the present embodiment, the exposure unit 238 is fixed to a position opposing the inclined portion 30 of the stage 12.

Accordingly, the exposure unit 238 effects digital exposure above the photosensitive material 22 as the photosensitive material 22 moves. As a result, exposure can be effected in accordance with the movement of the photosensitive material 22 as the photosensitive material 22 is conveyed. The exposure unit 238 does not move, and digital exposure can be effected simply. During exposure, the exposure unit 238 is fixed and light can be scan-exposed successively to the moving photosensitive material 22. Therefore, focusing of the exposure unit 238 is easy.

Further, because the exposure unit 238 is disposed at a position above the stage 12, the exposure unit 238 conducts exposure above the stage 12. Therefore, the apparatus can be made even more compact.

[Sixth Embodiment]

Figure 24:
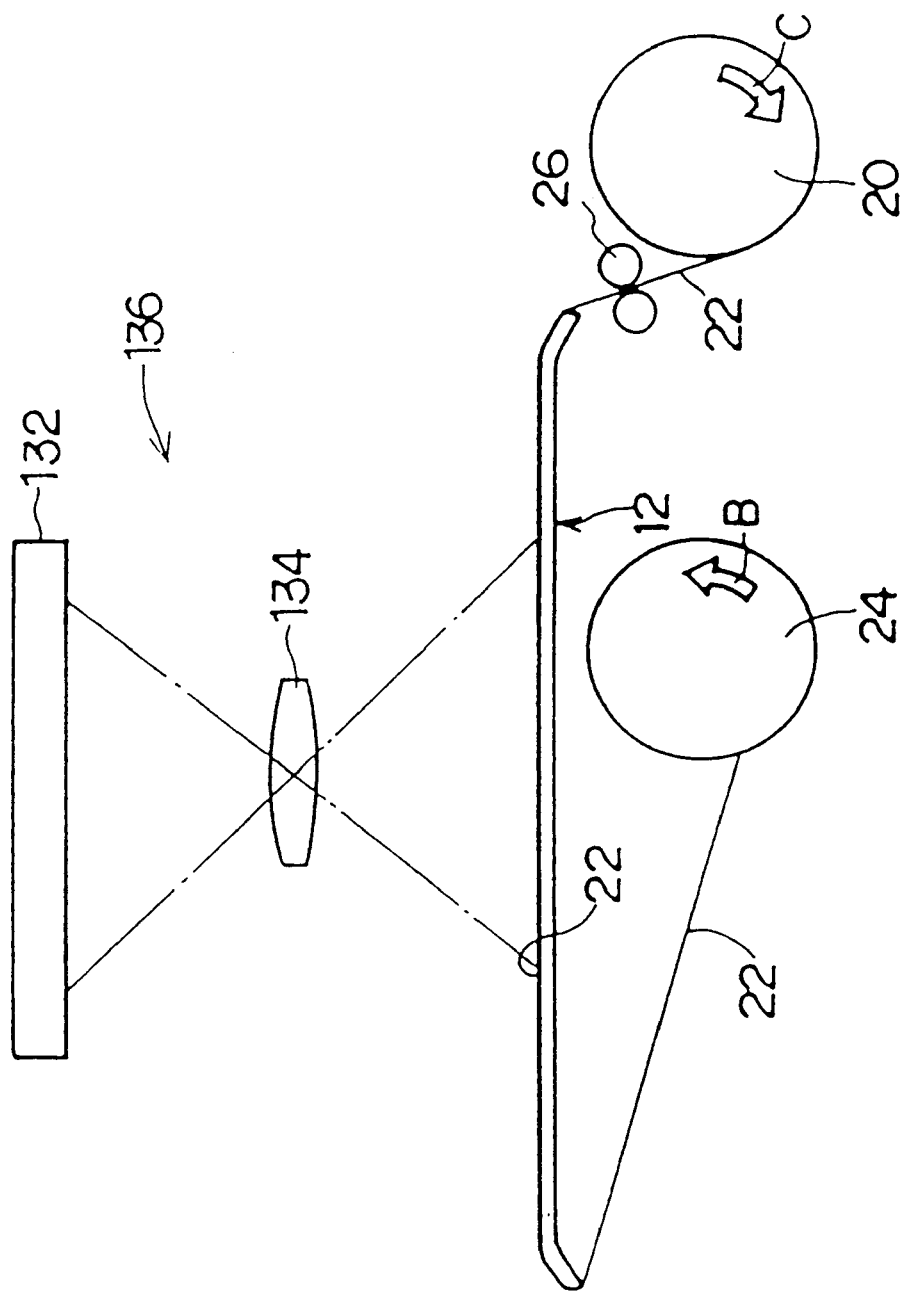
FIG. 24 is an enlarged view illustrating main portions of an image recording apparatus of a sixth embodiment.

Next, a sixth embodiment of the image recording apparatus relating to the present invention will be described on the basis of FIG. 24. Members which are the same as those of the third embodiment are denoted by the same reference numerals, and description thereof is omitted.

In the present embodiment, a liquid crystal device 132 housing a backlight and a liquid crystal display is disposed so as to oppose the stage 12. A lens 134, which images the image on the liquid crystal display 132 onto the photosensitive material 22 held on the stage 12, is disposed between the liquid crystal display 132 and the stage 12.

Accordingly, the exposure unit 136, which is an exposure means formed by the liquid crystal device 132 and the lens 134, can effect digital exposure planarly onto the photosensitive material 22 which is held on the stage 12. Therefore, digital exposure can be carried out in a short time, and the processing speed of the image recording apparatus is made faster.

Even if a Braun tube (CRT) is used in place of the liquid crystal display 132 in the present embodiment, the same operation and effects are achieved.

Further, each of the image recording apparatuses described in the third through the sixth embodiments can be used not only as a digital printer, but also as a video printer or the like. Further, in the image recording apparatuses, if the exposure unit for digital exposure is withdrawn, an exposure unit for analog exposure can be set. Therefore, both digital exposure and analog exposure can be used.

The photosensitive material used in the image recording apparatuses of the present invention may be a so-called heat development photosensitive material (e.g., the photosensitive material 22 of the above-described embodiments) in which a latent image, which is obtained by image-wise exposure, is heat development transferred onto an image-receiving material in the presence of solvent for image formation so as to obtain a visible image.

The heat development photosensitive material basically contains on a supporting body photosensitive silver halide, a reducing agent, binder and a dye providing compound (there are also cases in which the reducing agent is used as the dye providing compound). If needed, the photosensitive material can contain an organometallic base oxidizing agent or the like.

The heat development photosensitive material may provide a negative image or a positive image for exposure. A method utilizing a direct positive emulsion as the silver halide emulsion (there are two types of this method: a method using a nucleus forming agent, and a light fogging method), or a method utilizing a dye providing compound which releases a dye image which is diffusible positively can be used as a method of providing a positive image.

The photosensitive materials disclosed in, for example, Japanese Patent Application Laid-Open Nos. 6-161070 and 6-289555 can be used as the heat development photosensitive materials of the method of providing a positive image. The photosensitive materials disclosed in, for example, Japanese Patent Application Laid-Open Nos. 5-181246 and 6-242546 can be used as the heat development photosensitive materials of the method of providing a negative image.

Water, for example, may be used as the solvent for image formation of the present invention. The water used in the present invention is not limited to so-called demineralized water, and includes water in the general sense. Further, a mixed solvent of demineralized water and a low boiling point solvent such as methanol, DMF, acetone, di-isobutyl ketone or the like may be used as the solvent for image formation. Moreover, solvents including image formation accelerators, antifoggants, developing terminators, hydrophilic heat solvents, or the like may be used as the solvent for image formation.

What is claimed is:

1. An image recording apparatus in which an image is exposed on a photosensitive material, the photosensitive material and a sheet of image-receiving material are superposed and heat development transfer is effected so that an image is obtained on the sheet of image-receiving material, comprising:

a supply section accommodating the photosensitive material in a roll form and supplying the photosensitive material from one end side of the photosensitive material;

a take-up section taking up in a roll form the photosensitive material supplied from said supplying section;

stage provided at a conveying path of the photosensitive material between said supply section and said take-up section, and having a planar holding surface which holds the photosensitive material in a stationary position thereon while the sheet of image-receiving material is superposed onto the photosensitive material by a superposing unit which moves across said photosensitive material, said planar holding surface accommodating the entire sheet of image-receiving material; and peeling means which, when discharging the photosensitive material together with the sheet of image-receiving material off of the stage after heat development transfer, changes a conveying direction of the photosensitive material, by an angle of Ø with respect to the holding surface of said stage, to a direction of separating from the sheet of image-receiving material, and peels the photosensitive material and the sheet of image-receiving material.

2. An image recording apparatus according to claim 1, wherein said angle θ is 40 degrees to 50 degrees.

3. An image recording apparatus in which an image is exposed on a photosensitive material, the photosensitive material and a sheet of image-receiving material are superposed and heat development transfer is effected so that an image is obtained on the sheet of image-receiving material, comprising:

a supply section accommodating the photosensitive material in a roll form and supplying the photosensitive material from one end side of the photosensitive material;

a take-up section taking up in a roll form the photosensitive material supplied from said supplying section;

a stage provided at a conveying path of the photosensitive material between said supply section and said take-up section, and having a planar holding surface which holds the photosensitive material in a stationary position thereon while the sheet of image-receiving is superposed onto the photosensitive material by a superposing unit which moves across said photosensitive material, said planar holding surface accommodating the entire sheet of image-receiving material; and a portion which, when discharging the photosensitive material together with the sheet of image-receiving material off of the stage after heat development transfer, changes a conveying direction of the photosensitive material, by an angle of Ø with respect to the holding surface of said stage, to a direction of separating from the sheet of image-receiving material, and peels the photosensitive material and the sheet of image-receiving material.

4. An image recording apparatus according to claim 3, wherein said angle θ is 40 degrees to 50 degrees.

* * * * *